(12) United States Patent
Wright et al.

(10) Patent No.: US 8,260,055 B2
(45) Date of Patent: Sep. 4, 2012

(54) METHODS AND APPARATUS FOR IDENTIFYING PRIMARY MEDIA CONTENT IN A POST-PRODUCTION MEDIA CONTENT PRESENTATION

(75) Inventors: David Howell Wright, Safety Harbor, FL (US); Ronan Heffernan, Wesley Chapel, FL (US); Michael McLean, Woodbridge, CT (US); Kevin Keqiang Deng, Safety Harbor, FL (US); Paul Bulson, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 755 days.

(21) Appl. No.: 12/413,360

(22) Filed: Mar. 27, 2009

(65) Prior Publication Data

US 2010/0246955 A1 Sep. 30, 2010

(51) Int. Cl.
- *G06K 9/46* (2006.01)
- *G06K 9/66* (2006.01)
- *G06K 9/62* (2006.01)

(52) U.S. Cl. .......................... 382/190; 382/209; 382/236

(58) Field of Classification Search .................. 382/190, 382/209, 236
See application file for complete search history.

(56) References Cited

U.S. PATENT DOCUMENTS

| | | | |
|---|---|---|---|
| 4,611,347 A | 9/1986 | Netravali et al. | |
| 5,093,867 A | 3/1992 | Hori et al. | |
| 5,343,251 A | 8/1994 | Nafeh | |
| 5,455,892 A | 10/1995 | Minot et al. | |
| 5,528,703 A | 6/1996 | Lee | |
| 5,550,965 A | 8/1996 | Gabbe et al. | |
| 5,565,998 A | 10/1996 | Coombs et al. | |
| 5,668,917 A | 9/1997 | Lewine | |
| 5,812,732 A | 9/1998 | Dettmer et al. | |
| 6,133,946 A | 10/2000 | Cavallaro et al. | |
| 6,243,419 B1 * | 6/2001 | Satou et al. | 375/240.13 |

(Continued)

FOREIGN PATENT DOCUMENTS

WO WO2005057322 6/2005

(Continued)

OTHER PUBLICATIONS

IP Australia, "Examiner's First Report," issued in connection with Australian Patent Application No. 2010201158, mailed on Dec. 7, 2010 (7 pages).

(Continued)

*Primary Examiner* — John Strege
(74) *Attorney, Agent, or Firm* — Hanley, Flight & Zimmerman, LLC

(57) ABSTRACT

Methods and apparatus for identifying primary media content in a post-production media content presentation are disclosed. An example computer-implemented method to detect primary media content included in a secondary media content presentation disclosed herein comprises determining a first image corresponding to the secondary media content presentation, the first image comprising a plurality of image subregions, each image subregion representative of an inter-frame variation associated with a corresponding subregion of the secondary media content presentation, selecting a region of the first image comprising a plurality of connected image subregions of the first image together exhibiting a first type of inter-frame variation, and when a shape of the selected region of the first image corresponds to a predefined shape, processing a region of the first captured image corresponding to the selected region of the first synthetic image to identify the primary media content.

21 Claims, 14 Drawing Sheets

U.S. PATENT DOCUMENTS

| | | | |
|---|---|---|---|
| 6,845,213 | B2 | 1/2005 | Maas et al. |
| 7,020,336 | B2 | 3/2006 | Cohen-Solal et al. |
| 7,774,817 | B2 * | 8/2010 | Gupta .................. 725/86 |
| 2001/0047517 | A1 | 11/2001 | Christopoulos et al. |
| 2003/0021342 | A1 | 1/2003 | Nesvadba et al. |
| 2003/0050926 | A1 * | 3/2003 | Agnihotri et al. .......... 707/5 |
| 2005/0094032 | A1 | 5/2005 | Rogitz |
| 2005/0257151 | A1 | 11/2005 | Wu |
| 2007/0076957 | A1 | 4/2007 | Wang et al. |
| 2008/0148307 | A1 | 6/2008 | Nielsen et al. |
| 2009/0016618 | A1 | 1/2009 | Zhou |

FOREIGN PATENT DOCUMENTS

| | | |
|---|---|---|
| WO | WO2005079457 | 9/2005 |
| WO | WO2005079941 | 9/2005 |
| WO | WO2005107110 | 11/2005 |

OTHER PUBLICATIONS

IP Australia, "Examiner's Second Report," issued in connection with Australian Patent Application No. 2010201158, mailed on Jan. 9, 2012 (2 pages).

European Patent Office, "Extended European Search Report," issued in connection with European Patent Application No. 10003265.5 on Nov. 23, 2011 (7 pages).

Abe, Koji et al., "Segmentation of Broadcasted Baseball Videos into Every Inning and Plate Appearance," Institute of Electrical Engineers of Japan, published online in Wiley InterScience (www.interscience.wiley.com), 2006 (9 pages).

Duan, Ling-Yu et al., "Digesting Commercial Clips from TV Streams," IEEE Multimedia, Jan.-Mar. 2008 (14 pages).

* cited by examiner

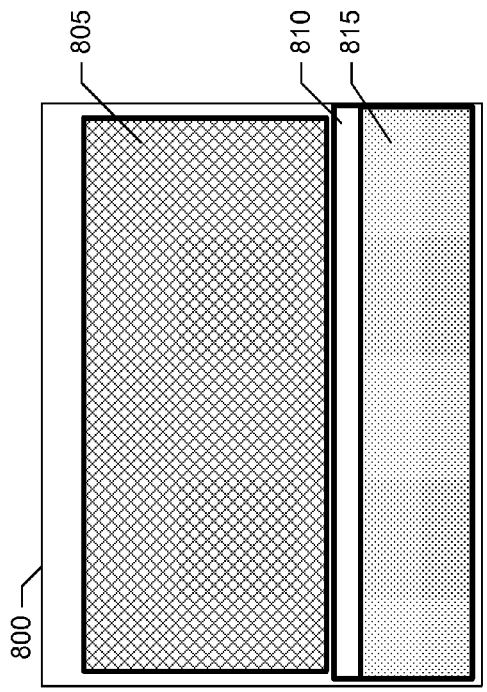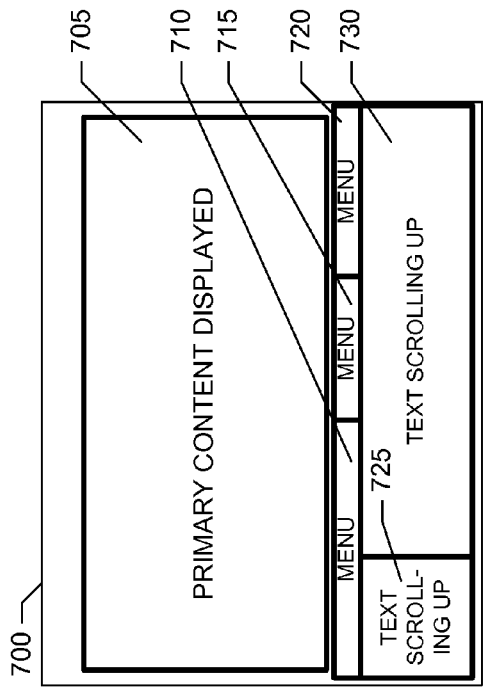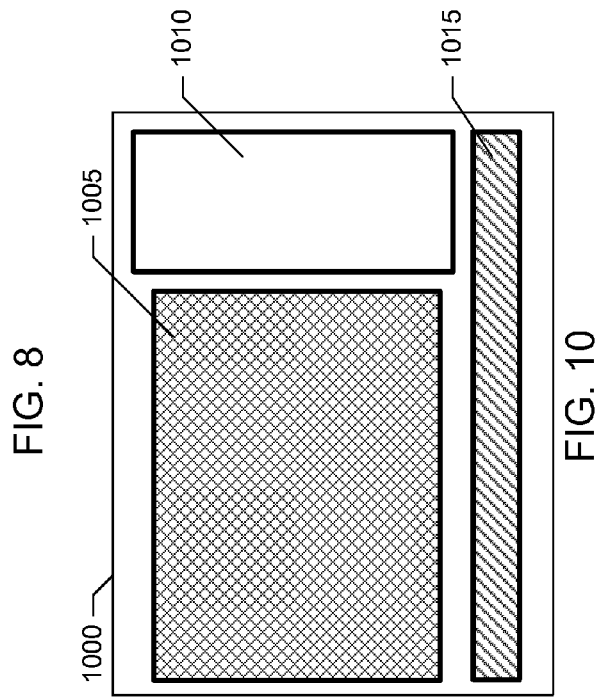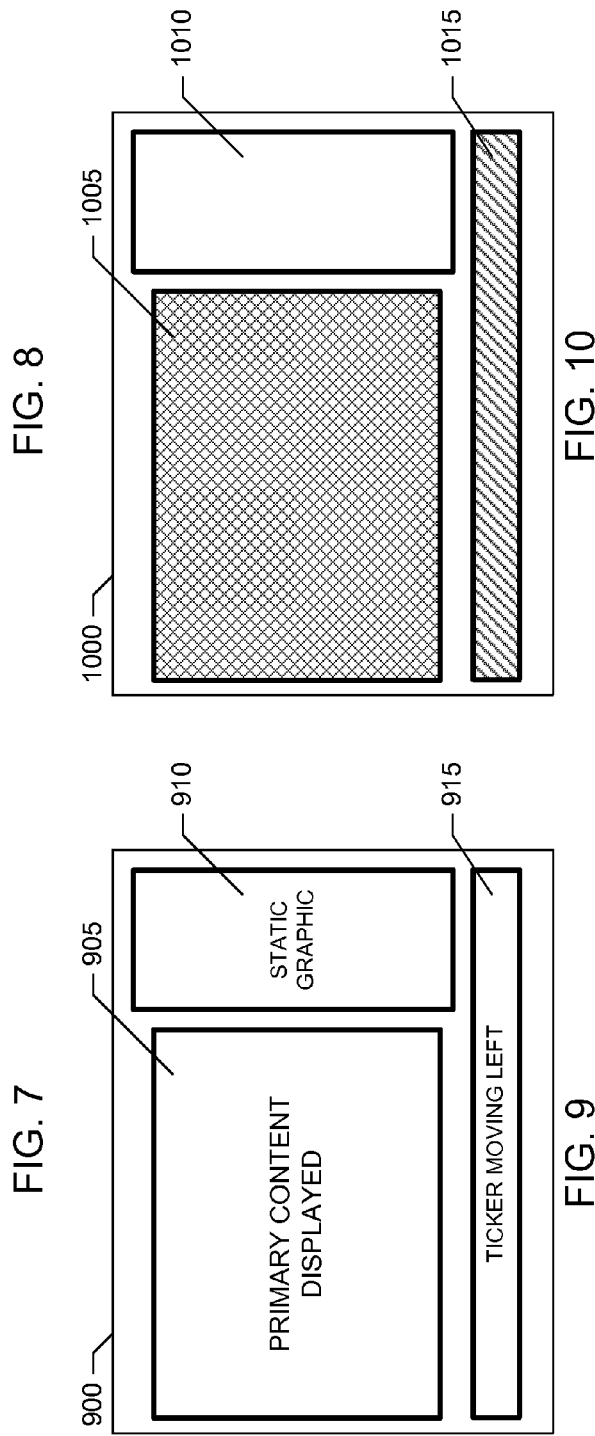

METHODS AND APPARATUS FOR IDENTIFYING PRIMARY MEDIA CONTENT IN A POST-PRODUCTION MEDIA CONTENT PRESENTATION

FIELD OF THE DISCLOSURE

This disclosure relates generally to media content monitoring and, more particularly, to methods and apparatus for identifying primary media content in a post-production media content presentation.

BACKGROUND

In many media broadcast systems, primary (e.g., original) media content undergoes post-production to create resulting secondary (e.g., post-production) media content for presentation to audience members. For example, primary media content (e.g., such as a movie, television program, commercial, etc.) may be cropped, resized and/or repositioned during post-production to allow other multimedia content (e.g., such as tickers, banners, program guides, etc.) to be presented simultaneously with the primary media content. For example, a post-production process may cause primary television program content to be shrunk and positioned in a first region encompassing an upper left portion of a video display. Then, a ticker may be included in a second region encompassing a bottom portion of the video display, with the ticker presenting information that scrolls to the left. An additional region of static, or semi-static, information may be included in a third region encompassing a right side of the video display. Many existing media content and/or commercial detection and/or identification techniques perform content monitoring by processing video images corresponding to the full video display containing the entire secondary (e.g., post-production) media content presentation.

BRIEF DESCRIPTION OF THE DRAWINGS

FIG. 7 illustrates a first example captured image corresponding to a first example secondary media content presentation processed by the example image pre-processor of FIG. 6.

FIG. 8 illustrates a first example synthetic image determined by the example image pre-processor of FIG. 6 from the first example captured image of FIG. 7.

FIG. 9 illustrates a second example captured image corresponding to a second example secondary media content presentation processed by the example image pre-processor of FIG. 6.

FIG. 10 illustrates of a second example synthetic image determined by the example image pre-processor of FIG. 6 from the second example captured image of FIG. 9.

DETAILED DESCRIPTION

Figure 1:
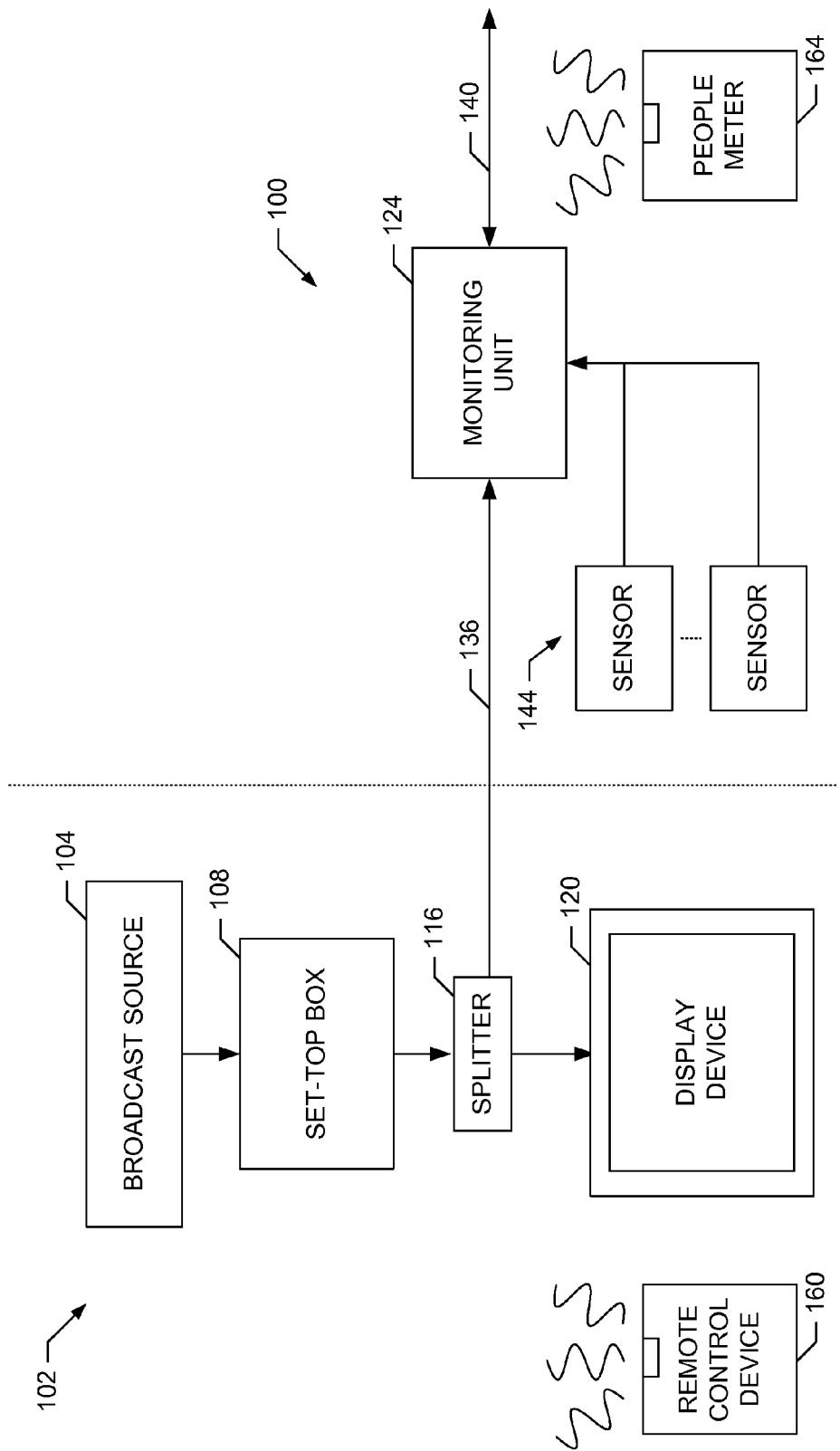
FIG. 1 is a block diagram of a first example media content monitoring system coupled to an example home entertainment system and capable of implementing the media content monitoring techniques described herein.

Methods and apparatus for identifying primary media content (such as a movie, television program, commercial, etc.) in a secondary (e.g., post-production) media content presentation are disclosed herein. In an example disclosed herein, a computer-implemented method to detect primary media content included in a secondary media content presentation comprises determining a first image corresponding to the secondary media content presentation, the first image comprising a plurality of image subregions, each image subregion representative of inter-frame variation associated with a corresponding subregion of the secondary media content presentation. The example method also comprises selecting a region of the first image comprising a plurality of connected image subregions of the first image together exhibiting a first type of inter-frame variation. Furthermore, the example method comprises, when a shape of the selected region of the first image corresponds to a predefined shape, processing a region of the secondary media content presentation corresponding to the selected region of the first image to detect the primary media content.

In another example disclosed herein, an article of manufacture stores machine readable instructions which, when executed, cause a machine to determine a first synthetic image corresponding to a first captured image representative of a secondary media content presentation including primary media content and other media content, the first synthetic image comprising a plurality of synthetic image subregions, each synthetic image subregion encoded to represent inter-frame variation associated with a corresponding subregion of the first captured image. The example machine readable instructions, when executed, also cause the machine to select a region of the first synthetic image comprising a plurality of connected synthetic image subregions of the first synthetic image together exhibiting substantially non-uniform variation. Furthermore, the example machine readable instructions, when executed, cause the machine to, extract a region of the first captured image corresponding to the selected region of the first synthetic image to identify the primary media content when a shape of the selected region of the first synthetic image corresponds to a predefined shape.

In yet another example disclosed herein, a media content monitoring unit comprises an image pre-processor to determine a first synthetic image corresponding to a first captured image representative of a secondary media content presentation monitored by the media content monitoring unit, the first synthetic image comprising a plurality of synthetic image subregions, each synthetic image subregion encoded to represent inter-frame variation associated with a corresponding subregion of the first captured image. The example image pre-processor is also to select a region of the first synthetic image comprising a plurality of connected synthetic image subregions of the first synthetic image together exhibiting substantially non-uniform variation, the selected region excluding a portion of the first synthetic image. Furthermore, the example image pre-processor is to, when a shape of the selected region of the first synthetic image corresponds to a predefined shape, extract a region of the first captured image corresponding to the selected region of the first synthetic image to identify primary media content included in the secondary media content presentation. Additionally, the example media content monitoring unit comprises a signature generator to generate a signature from the region of the first captured image extracted by the image pre-processor, and a hint processor to process hint information associated with the region of the first captured image extracted by the image pre-processor to determine whether the primary media content corresponds to a commercial.

Existing media content and/or commercial detection and/or identification techniques may suffer performance degradation if such techniques perform content monitoring by processing video images corresponding to the full video display containing the entire secondary (e.g., post-production) media content presentation, instead of only the region including the primary media content. In contrast, at least some of the example media content monitoring methods and apparatus described herein employ computer vision techniques to segment video images representative of the secondary (e.g., post-production) media content presentation into multiple regions and then to select one or more regions including the primary program content. Then, only the selected region(s) of the secondary media content presentation are extracted and provided to enhanced media content and/or commercial detection/identification processors to enable improved media content identification and/or commercial detection.

Additionally, at least some of the example media content monitoring implementations make use of stored profiles, as well as automatic region selection techniques, to segment the secondary media content presentation and select the region(s) of interest including the primary media content. For example, if stored profiles are available and configured for use, an example media content monitoring implementation uses the stored profiles to segment the secondary media content presentations into multiple regions specified by the stored profiles and to then select one or more regions of interest in the secondary media content presentation that correspond to the primary media content. However, if stored profiles are not available, or are not configured for use, the example media content monitoring implementation performs one or more automatic region selection techniques as described below to segment the secondary media content presentation and select the region(s) of interest corresponding to the primary media content.

Upon selecting a region of interest corresponding to the primary media content using stored profiles and/or automatic selection, the example media content monitoring implementation extracts the selected region from the secondary media content presentation and provides the primary media content included therein to enhanced media content identification and/or commercial detection processors for subsequent processing. Additionally, at least some example media content monitoring implementations may extract other segmented regions of interest corresponding to other secondary (e.g., post-production) media content (e.g., such as tickers, banners, program guides, etc.) for use in augmenting media content identification and/or commercial detection.

In an example media content monitoring implementation employing automatic region selection, the media content monitoring implementation initially performs sequential frame analysis to generate synthetic images from a monitored video stream providing the secondary (e.g., post production) media content presentation. Each synthetic image represents a visual depiction of inter-frame variation (e.g., difference and/or motion) in the monitored video stream at a particular monitoring time. For example, the media content monitoring implementation may determine the variation (e.g., difference and/or motion) associated with sequential image frames of the monitored video stream and represent each type of variation as a different color and/or pattern in a generated synthetic image. For example, motion to the left, right, up and down may be represented in the generated synthetic image by different first, second, third and fourth colors and/or patterns, respectively. Additionally, a fifth color and/or pattern may be used to represent inter-frame differences not associated with motion, such as differences associated with the abrupt scene changes, gradual fading in and/or out of objects in a scene, etc. Additionally or alternatively, a sixth color and/or pattern may be used to represent the absence of motion and/or substantially no inter-frame difference associated with the particular subregion. The example media content monitoring implementation may determine the variation (e.g., differences and/or motion) in sequential images by comparing the sequential images using any appropriate image processing technique. Additionally or alternatively, the example media content monitoring implementation may extract information indicative of variation (e.g., differences and/or motion) from the encoded video stream providing the monitored secondary media content presentation. Examples of such information include Moving Picture Experts Group (MPEG) motion vectors and static macroblocks representing the absence of motion.

Next, to perform region segmentation, the example media content monitoring implementation processes the generated synthetic image (or an unmodified video image captured from the monitored video stream if synthetic images are not available) using any appropriate edge detection, line detection, feature detection, feature extraction or similar technique to detect edges in the synthetic image. Example edge detection techniques supported by the example methods and apparatus described herein include Canny edge detection, the generalized Hough transform, etc. The example media content monitoring implementation then examines the detected edges to segment the synthetic image corresponding to the secondary media content presentation into multiple regions. One or more of the segmented region(s) consistent with a primary content display are then selected. For example, the media content monitoring implementation may examine the segmented synthetic image for edges defining regions having some minimum size and certain aspect ratio, such as 4:3 or 16:9, corresponding to known video formats. The example media content monitoring implementation then analyzes successive images (e.g., successive synthetic images) to determine whether any candidate region(s) remain consistent over multiple frames. If such a region is found, and the inter-frame variation (e.g., difference and/or motion) associated with the region is non-uniform (indicating varied motion and/or differences in the identified region), the example media content monitoring implementation identifies the region as containing the primary media content and extracts this region from the unmodified video image for subsequent media content identification and/or commercial detection/identification processing as described below. Multiple such regions having substantially non-uniform variation can be found and extracted to support operating scenarios in which primary content (from the same or different sources) is displayed in multiple different regions of the secondary media content presentation. Additionally, the example media content monitoring implementation may search for other regions having motion that is consistently in one direction and indicative of a ticker display, a scrolling guide, etc. The example media content monitoring implementation may also search for other regions exhibiting substantially no motion and/or differences, and which are indicative of banners, station logos, etc.

A block diagram of a first example media content monitoring system 100 capable of identifying primary media content in a secondary media content presentation provided via an example home entertainment system 102 is illustrated in FIG. 1. The example home entertainment system 102 includes a media source 104, a set-top box (STB) 108, a signal splitter 116 and a display device 120. The example media content monitoring system 100 includes a monitoring unit 124. The components of the home entertainment system 102 and the media content monitoring system 100 may be connected in any appropriate manner including that shown in FIG. 1. For example, in a statistically selected household having one or more home entertainment systems 102, the monitoring unit 124 may be implemented as a single home unit and one or more site units. In such a configuration, the single home unit performs the functions of storing data and forwarding the stored data to a central facility (such as the central facility 211 of FIG. 2 discussed below) for subsequent processing. Each site unit is coupled to a corresponding home entertainment system 102 and performs the functions of collecting viewing/metering data, processing such data (possibly in real-time) and sending the processed data to the single home unit for that home. The home unit receives and stores the data collected by the site units and subsequently forwards that collected data to the central facility. As another example, some or all of the first example media content monitoring system 100 can be implemented in a single media device, such as the STB 108, the display device 120, a computer system, a multimedia computing device (e.g., such as a gaming device, a mobile phone, a personal digital assistant (PDA), etc.), etc.

The media source 104 may be any media source, such as a cable television service provider, a satellite television service provider, a direct satellite feed, a radio frequency (RF) television service provider, an internet streaming video/audio provider (e.g., such as Netflix, Inc.), a video-on-demand (VOD) provider, a digital versatile disk (DVD) player, a video cassette recorder (VCR), a video game console, a digital video recorder (DVR), etc. The media source 104 may provide analog and/or digital television signals to the home entertainment system 102, for example, over a coaxial cable or via a wireless connection.

The STB 108 may be any set-top box, such as a cable television converter, a direct broadcast satellite (DBS) decoder, a video cassette recorder (VCR), etc. The set-top box 108 receives a plurality of broadcast channels from the media source 104. Typically, the STB 108 selects one of the plurality of broadcast channels based on a user input, and outputs one or more signals received via the selected broadcast channel. In the case of an analog signal, the STB 108 tunes to a particular channel to obtain programming delivered on that channel from the media source 104. For a digital signal, the STB 108 may tune to a channel and decode certain packets of data to obtain programming delivered on a selected channel. For example, the STB 108 may tune to a major channel and then extract a program carried on a minor channel within the major channel via the decoding process mentioned above. For some home entertainment systems 102, for example, those in which the media source 104 is a standard RF analog television service provider or a basic analog cable television service provider, the STB 108 may not be present as its function is performed by a tuner in the display device 120.

An output from the STB 108 is fed to a signal splitter 116, such as a single analog y-splitter in the case of an RF coaxial connection between the STB 108 and the display device 120, an audio/video splitter in the case of a direct audio/video connection between the STB 108 and the display device 120, a digital data splitter in the case of a digital data interface (e.g., such as a high-definition multimedia interface (HDMI)) used to connect the STB 108 and the display device 120, etc. (For configurations in which the STB 108 is not present, the media source 104 may be coupled directly to the signal splitter 116 or the signal splitter 116 may be replaced with a connection from a video output of the display device 120). In the example home entertainment system 102, the signal splitter produces two signals indicative of the output from the STB 108. Of course, a person of ordinary skill in the art will readily appreciate that any number of signals may be produced by the signal splitter 116.

In the illustrated example, one of the two signals from the signal splitter 116 is fed to the display device 120 and the other signal is delivered to the monitoring unit 124. The display device 120 may be any type of television or television display device. For example, the display device 120 may be a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, or may be a multimedia computer system, etc.

The second of the two signals from the signal splitter 116 (i.e., the signal carried by connection 136 in FIG. 1) is coupled to an input of the monitoring unit 124. In an example implementation, the monitoring unit 124 implements a data logging and processing unit that may be used to generate viewing records and other viewing information useful for determining viewing and other metering information. Such an example monitoring unit 124 may collect a set of viewing records and transmit the collected viewing records over a connection 140 to a central facility or data processing facility (not shown) for further processing or analysis. The connection 140 may be a telephone line, a return cable television connection, an RF or satellite connection, an Internet connection or the like.

In the illustrated example, the monitoring unit 124 is configured to determine identifying information corresponding to primary media content from a video signal providing a secondary (e.g., post-production) media content presentation being output by the STB 108. For example, the secondary media content presentation can correspond to primary content (e.g., such as a movie, a television program, a commercial, promotional content, and infomercial, a public service announcement, etc.) that is augmented with other secondary content at the media source 104 and/or by the STB 108 (and/or the display device 120). For example, the secondary media content presentation can be created via post production augmentation by a network, cable provider, web site, syndicator, broadcast station, etc., associated with the media source 104. Additionally or alternatively, the secondary media content presentation can be created by the STB 108 (and/or the display device 120) through addition of local multimedia content (e.g., such as an electronic program guide) to the received primary and/or secondary media content.

In an example implementation, the monitoring unit 124 may be configured to generate a signature from the video signal received via connection 136, with the signature corresponding to a region of the secondary media content presentation being provided by the STB 108 for display on the display device 120, with the region corresponding to primary media content included in the secondary media content presentation. Additionally or alternatively, the example monitoring unit 124 may be configured to extract a watermark embedded in the video signal received via connection 136 that corresponds to a region included in the secondary media content presentation being provided by the STB 108 for display on the display device 120, with the region corresponding to primary media content included in the secondary media content presentation. The example monitoring unit 124 may then add this primary media content identifying information to the viewing records corresponding to the secondary media program presentation provided by the STB 108 and the display device 120.

To facilitate the determination of program identifying information and the generation of viewing records for primary media content included in the secondary media program presentation provided by the STB 108 and the display device 120, the monitoring unit 124 may also be provided with one or more sensors 144. For example, one of the sensors 144 may be a camera coupled with an image capturing device, such as an image framegrabber, to capture images displayed on the display device 120. Such a sensor 144 could be used in lieu of, or along with, the connection 136 providing the video signal to the example monitoring unit 124. Another of the sensors 144 could be a frequency detector to determine, for example, the channel to which the display device 120 is tuned. One having ordinary skill in the art will recognize that there are a variety of sensors 144 that may be coupled with the monitoring unit 124 to facilitate generation of viewing records containing sufficient information for the central facility to determine a set of desired ratings and/or metering results.

The example home entertainment system 102 also includes a remote control device 160 to transmit control information that may be received by any or all of the STB 108, the display device 120 and the monitoring unit 124. One having ordinary skill in the art will recognize that the remote control device 160 may transmit this information using a variety of techniques, including, but not limited to, infrared (IR) transmission, radio frequency transmission, wired/cabled connection, and the like.

The example media content monitoring system 100 also includes an audience identifier 164, such as a people meter 164, to capture information about the audience. The example audience identifier 164 may have a set of input keys, each assigned to represent a single viewer, and may prompt the audience members to indicate that they are present in the viewing audience by pressing the appropriate input key. The audience identifier 164 may also receive information from the monitoring unit 124 to determine a time at which to prompt the audience members to provide their identities. Moreover, the monitoring unit 124 may receive information from the audience identifier 164 to modify an operation of the monitoring unit 124 (such as causing the monitoring unit to generate one or more viewing records based on a change in the viewing audience). As will be appreciated by one having ordinary skill in the art, the audience identifier 164 may receive and/or transmit information using a variety of techniques, including, but not limited to, infrared (IR) transmission, radio frequency transmission, wired/cabled connection, and the like. As will also be appreciated by one having ordinary skill in the art, the audience identifier 164 may be implemented by a combination of the remote control device 160 and one or more of the STB 108 and/or the monitoring unit 124. In such an implementation, the STB 108 and/or the monitoring unit 124 may be configured to display prompting information and/or other appropriate people meter content directly on the display device 120. Correspondingly, the remote control device 160 may be configured to accept inputs from the viewing audience and transmit these user inputs to the appropriate device responsible for generating the people meter display on the display device 120.

Figure 2:
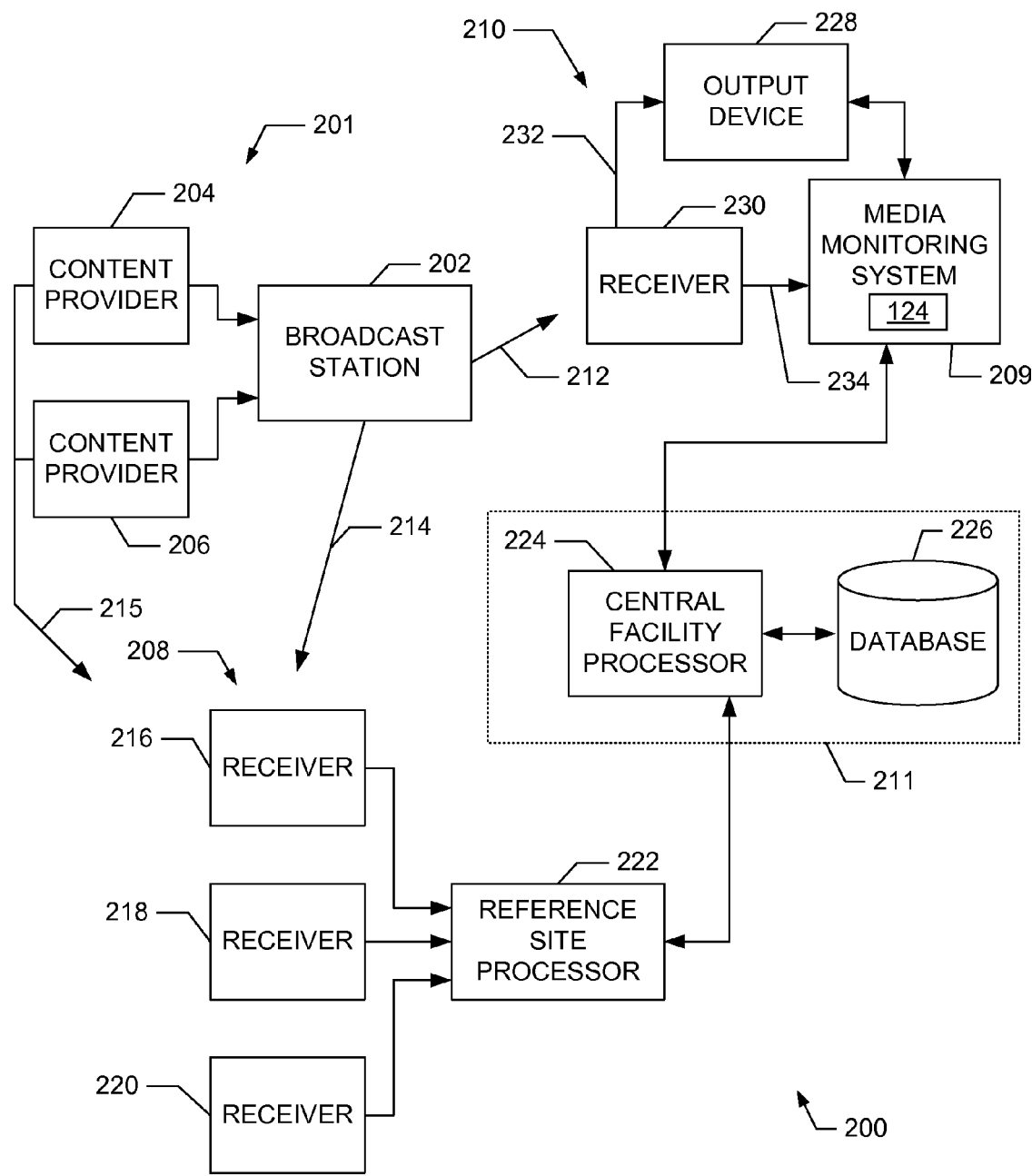
FIG. 2 is a block diagram of an example broadcast system and a second example media content monitoring system capable of implementing the media content monitoring techniques described herein.

FIG. 2 illustrates a second example monitoring system 200 to monitor primary (e.g., original) program content included in secondary (e.g., post-production) media content presentation provided by an example broadcast system 201. The example broadcast system 201 of FIG. 2 includes a broadcast station 202 that receives primary audio/video content from a plurality of content providers 204 and 206. The audio/video content providers 204 and 206 may provide audio and/or video programs or information, such as television programs, advertisements, audio (e.g., radio) programs, still image information (e.g., web pages), etc., in any appropriate manner to the broadcast station 202. The example broadcast station 202 performs post-production processing on the received primary content to generate secondary media content for transmission to the receiving site(s) served by the broadcast station 202.

The example monitoring system 200 of FIG. 2 includes one or more reference sites 208, a plurality of media content monitoring systems 209 (for example, a set of systems similar or identical to the example media content monitoring system 100 of FIG. 1) located at a plurality of home sites 210 (which may be statistically selected to represent a larger population) and a central facility 211 to compile and process data collected by the media content monitoring systems 209. For ease of reference, only one home site 210, one reference site 208 and one central facility 211 are shown in FIG. 2. However, persons of ordinary skill in the art will appreciate that any number of home sites 210, reference sites 208 and/or central data collection and processing facilities 211 may be employed.

The broadcast station 202 transmits one or more signals containing the secondary (e.g., post-production) digital and/or analog audio/video content. These signals are received by at least one statistically selected home site 210 via communication paths or links 212. Additionally, the broadcast station 202 transmits one or more signals containing the primary digital and/or analog audio/video content to at least one reference site 208 via communication paths or links 214. Additionally or alternatively, one or more of the plurality of content providers 204 and 206 may transmit one or more signals containing the primary digital and/or analog audio/video content to at least one reference site 208 via communication paths or links 215. The communication paths or links 212, 214 and 215 may include any combination of hardwired or wireless links, such as satellite links, wireless land-based links, cable links, etc. The signals conveyed via the links 212, 214 and 215 may contain multi-program analog signals and/or digital data streams which are commonly employed within existing broadcast systems.

In the example monitoring system 200, the reference site 208 includes a plurality of receivers (e.g., set-top boxes, tuner cards, external tuners, or the like) 216, 218 and 220 that simultaneously demodulate, demultiplex and/or decode audio, video and/or other information received from the broadcast station 202 and/or one or more of the plurality of content providers 204 and 206. In the illustrated example, each of the receivers 216, 218 and 220 provides audio and/or video information associated with different primary (e.g., original) media content to a reference site processor 222. In other words, the receiver 216 may provide audio and/or video information associated with primary (e.g., original) media content A while the receivers 218 and 220 provide audio and/or video information associated with respective primary (e.g., original) media content B and C. In addition, the reference site processor 222 is configured to control each of the receivers 216, 218 and 220 and/or has information indicating the primary media content which each of the receivers 216, 218 and 220 is configured to receive at any given time.

In the illustrated example, the reference site processor 222 determines original broadcast date/time stamps, extracts embedded watermark information and/or generates reference signature information for a plurality of primary (e.g., original) audio/video content. The reference site processor 222 sends the original broadcast time stamps (if available) and the reference watermark and/or signature information to a central facility processor 224 which stores the original broadcast time stamps and the reference watermark and/or signature information in a database 226. In an example implementation as described in greater detail below in connection with FIG. 3, the reference site processor 222 extracts the embedded watermark information and/or generates reference signature information from identified regions of secondary media content in which primary media content is included.

The home site 210 could be, for example, a statistically selected home containing a television, a radio, a computer, etc. The home site 210 includes an output device 228 (e.g., a video display, speaker, etc., such as the display device 120 of FIG. 1). The home site 210 also includes a receiver 230, such as the STB 108 of FIG. 1, which may be similar or identical to the receivers 216, 218 and 220. The receiver 230 provides audio and/or video signals 232 to the output device 228 that are used to present the secondary (e.g., post-production) media broadcast currently selected for consumption.

To monitor the use of the receiver 230, the home site 210 is provided with a media content monitoring system 209, such as the first example media content monitoring system 100 of FIG. 1. The example media content monitoring system 209 includes the example monitoring unit 124 discussed above in connection with FIG. 1. The receiver 230 provides an audio and/or a video signal containing audio and/or video information associated with the currently displayed secondary (e.g., post-production) media content presentation to the media content monitoring system 209 via a connection 234. The media content monitoring system 209 uses the signal received via the connection 234 to extract watermark information and/or generate signature information corresponding to regions of the primary (e.g., original) program content included in the secondary (e.g., post-production) program content currently being displayed on the output device 228. The media content monitoring system 209 stores and periodically conveys this watermark and/or signature information to the central facility processor 224, for example, in the form of a viewing record or set of records.

The central facility processor 224, in addition to being able to perform other processing tasks, is configured to compare watermark and/or signature information determined at the home site 210 to the reference watermark and/or signature information stored in the database 226 to identify the primary program content that was displayed at the home site 210. To facilitate the comparison of watermark and/or signature information received from the reference site 208 to the watermark and/or signature information received from the home site 210, the reference site processor 222 and the media content monitoring system 209 may generate time stamp information and associate such time stamp information with the watermark and/or signature information collected at the corresponding time. In this manner, the central facility processor 224 can attempt to align the watermark and/or signature information received from the reference sites 208 with the watermark and/or signature information collected at the corresponding times via the home site 210 to thereby reduce the number of comparisons required to identify a match.

Figure 3:
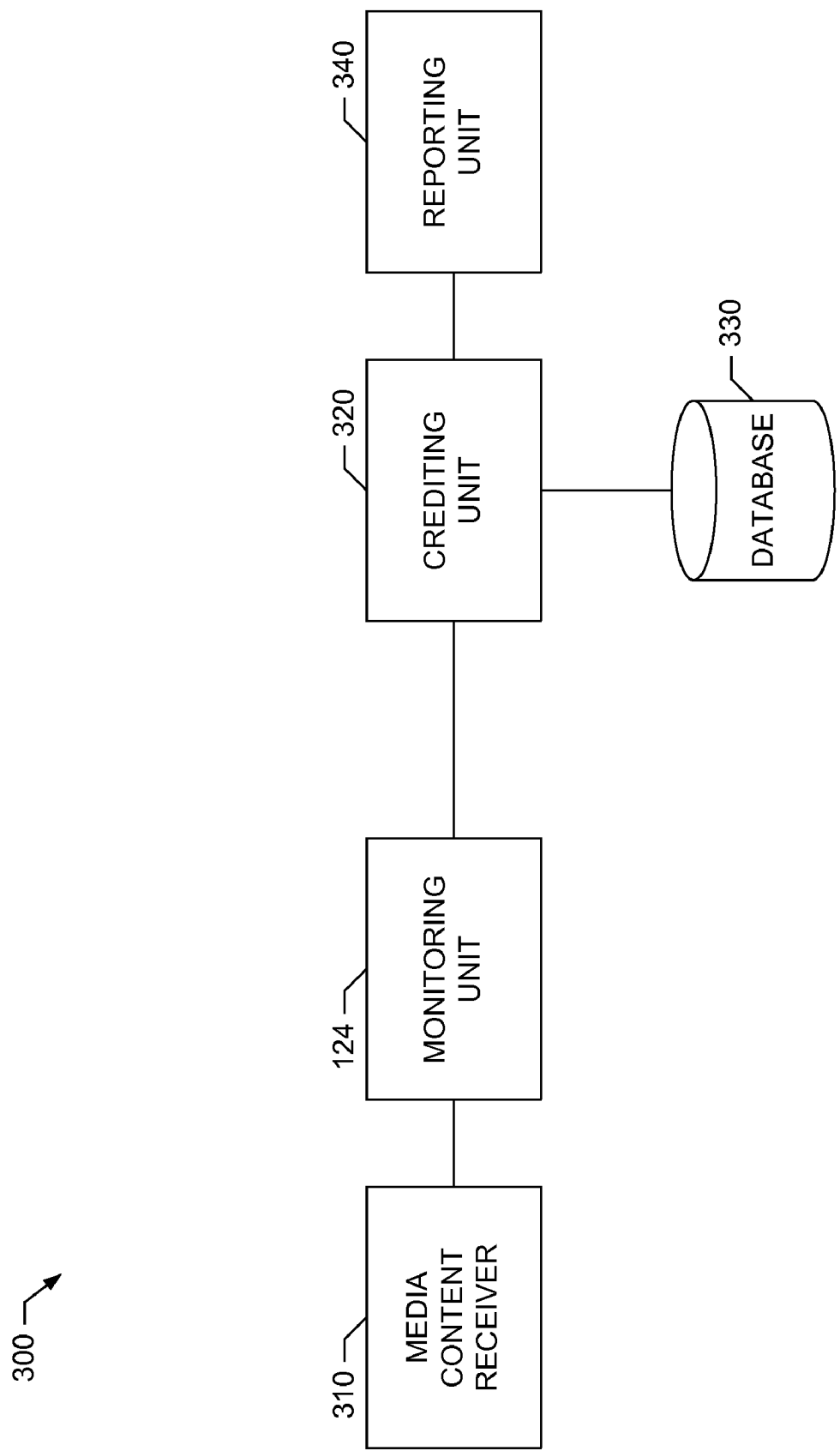
FIG. 3 is a block diagram of a third example media content monitoring system capable of implementing the media content monitoring techniques described herein.

A block diagram of a third example media content monitoring system 300 capable of identifying primary (e.g., original) media content included in regions of a secondary (e.g., post-production) media content presentation is illustrated in FIG. 3. Similar to the example monitoring systems of FIGS. 1 and 2, the example media content monitoring system 300 of FIG. 3 can be adapted to monitor the primary content included in a secondary media content presentation selected for viewing at a particular viewing site, such as a statistically selected household. Additionally or alternatively, the example media content monitoring system 300 of FIG. 3 can be implemented, for example, at a reference site (such as one or more of the example reference sites 208 and/or the example central facility 211 of FIG. 2) and adapted to implement a broadcast verification system to centrally monitor multiple (e.g., tens, hundred, thousands, etc.) secondary media content broadcasts to verify that certain primary media content was included in the respective broadcasted secondary media content. For example, the media content monitoring system 300 of FIG. 3 can be adapted for use in a content detection/verification system to determine that certain primary content (e.g., such as a movie, a television program, a commercial, promotional content, and infomercial, a public service announcement, etc.) was included in broadcasted post-production media content. As a particular example of such an adapted content detection/verification system, a commercial detection/verification system employing the example media content monitoring system 300 can be used to compile advertising data by monitoring broadcasted post-production media content and identifying the airing of commercials, also known as advertising spots or creatives. The example media content monitoring system 300 included in such an adapted commercial detection/verification system allows such aired commercials to be identified reliably because identification is focused on only those regions of the monitored secondary media content presentation that could include the primary commercial content. In general, the example media content monitoring system 300 of FIG. 3 can be adapted for use in any operating environment in which any type of primary content (from the same or multiple sources) is to be detected and/or identified as being included in a secondary media content presentation (e.g., provided by a broadcast signal, data streaming, downloaded data, etc.).

Figure 4:
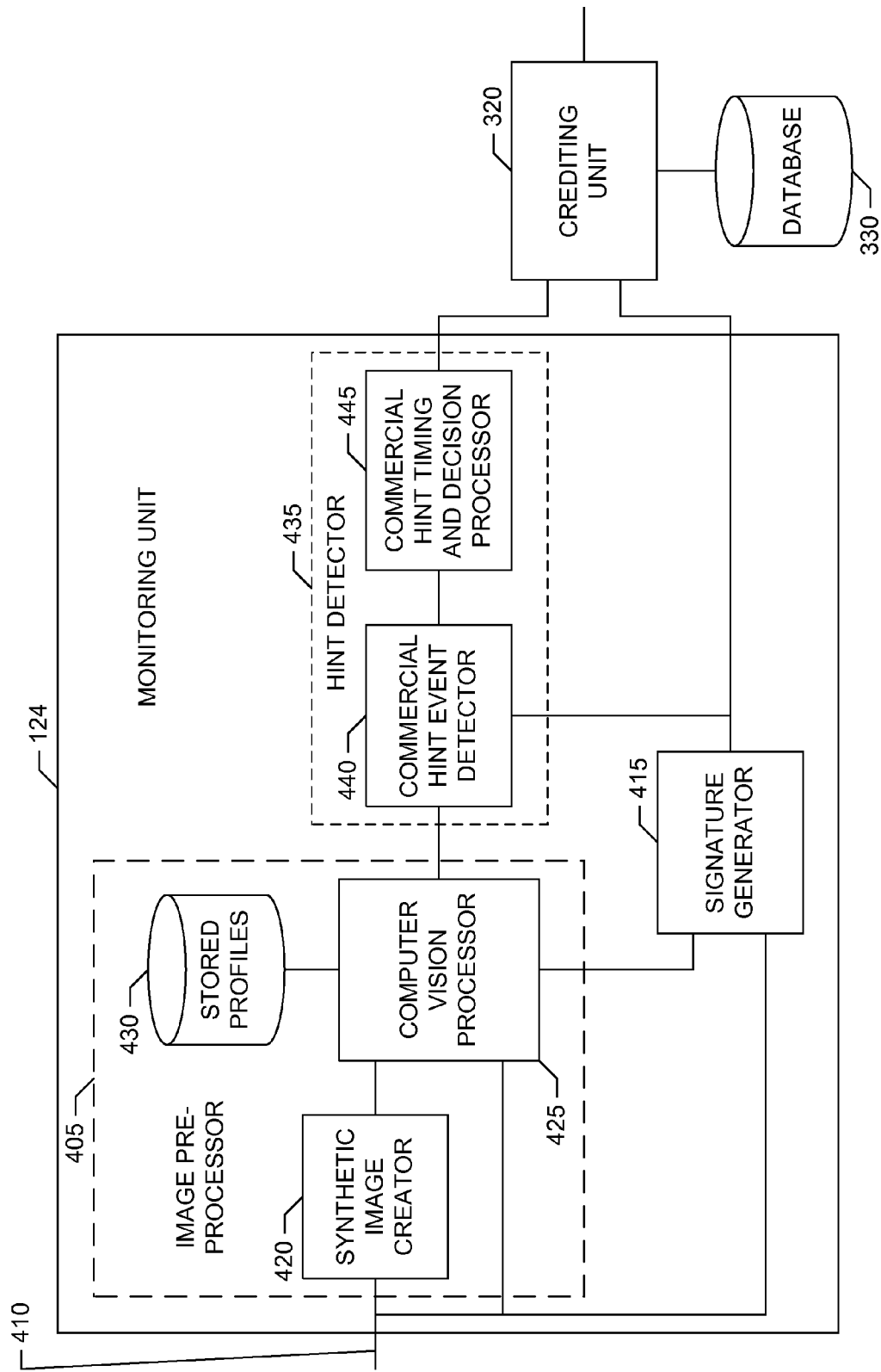
FIG. 4 is a block diagram of a first example media content monitoring unit that may be used to implement the example media content monitoring systems of FIGS. 1, 2 and/or 3.
Figure 5:
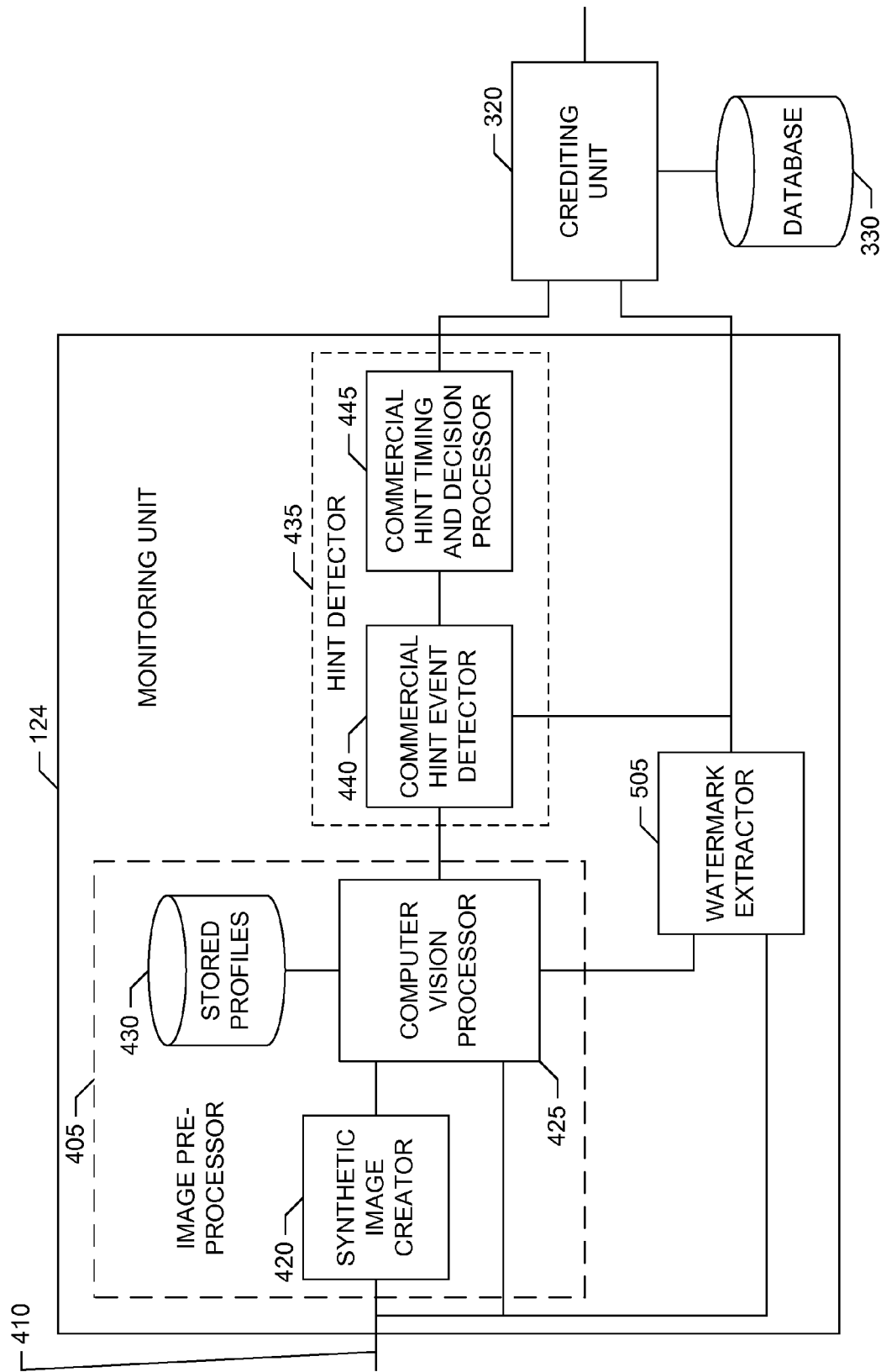
FIG. 5 is a block diagram of a second example media content monitoring unit that may be used to implement the example media content monitoring systems of FIGS. 1, 2 and/or 3.

Turning to FIG. 3, the example media content monitoring system 300 includes the example monitoring unit 124, also shown in FIGS. 1 and 2, to monitor a secondary media content presentation provided by an example media content receiver 310. The example media content receiver 310 may correspond to any combination of the STB 108 and/or example display device 120 of FIG. 1, the receiver 230 and/or output device 228 of FIG. 2, and/or any other type of media content receiver capable of generating a video or image presentation. As discussed above, the example monitoring unit 124 processes a video signal or video presentation provided by the example media content receiver 310 to generate video signatures and/or extract video watermarks. In the illustrated example, the generated video signatures and/or extracted video watermarks correspond to primary media content (e.g., such as a movie, television program, commercial, etc.) included in one or more selected regions of the secondary media content presentation displayed by the example media content receiver 310. The generated video signatures and/or extracted video watermarks can be used to identify the primary media content as discussed in greater detail below. Additionally, the example monitoring unit 124 may include one or more hint detectors to process the generated video signatures and/or extracted video watermarks, as well as other information determined by the example monitoring unit 124, to improve the accuracy of identifying the primary media content included in the secondary media content presentation. Example implementations of the monitoring unit 124 are illustrated in FIGS. 4 and 5, which are described in greater detail below.

In the illustrated example of FIG. 3, the monitoring unit 124 provides the generated video signatures and/or extracted video watermarks corresponding to the primary media content, as well any additional hint information, to a crediting unit 320 for subsequent processing. In an example implementation, the crediting unit 320 is implemented by the central facility processor 224 of FIG. 2, which is at a different location than the monitoring unit 124. In such an implementation, the example monitoring unit 124 may include the generated video signatures and/or extracted video watermarks, as well any additional hint information, in one or more viewing records encapsulated for transmission over any appropriate data connection, such as the example connection 140 of FIG. 1. In another example implementation, such as a commercial detection/verification system, the crediting unit 320 is co-located with the example monitoring unit 124, or may be implemented in the same device as the example monitoring unit 124. In such an implementation, the example monitoring unit 124 may pass the generated video signatures and/or extracted video watermarks, as well any additional hint information, via a bus and/or memory transfer to the crediting unit 320.

The example crediting unit 320 operates to process the generated video signatures and/or extracted video watermarks, as well any additional hint information, to identify the primary (e.g., original) media content included in the secondary (e.g., post-production) media content presentation being monitored by the example monitoring unit 124. In an example implementation, the crediting unit 320 is configured to compare the generated video signatures that are representative of the monitored primary media content to one or more reference signatures stored in an example database 330, such as the example database 226 of FIG. 2, and that are representative of known reference media content. For example, as described above in connection with FIG. 2, the reference signatures may be determined by the example reference site processor 222 for a plurality of reference primary (e.g., original) media content (e.g., such as movies, television programs, commercials, etc.) provided by the one or more content providers 204. In such an example implementation, when a generated video signature representative of the monitored primary media content is determined to match a reference signature, the example crediting unit 320 credits the monitored primary media content as corresponding to the reference primary media content represented by the matching reference signature.

In another example implementation, the crediting unit 320 is configured to detect and decode the extracted watermarks corresponding to the primary media content being monitored by the example monitoring unit 124. For example, the crediting unit 320 may perform error detection and/or correction on an extracted watermark to obtain a valid (e.g., error-free) watermark. Then, the detected/corrected watermark may be decoded to obtain any information carried by the watermark. Such information may include one or more identifiers that may be used to identify the primary media content into which the watermark was embedded. Additionally or alternatively, the example crediting unit 320 may compare the extracted watermarks to one or more reference watermarks stored in the example database 330 and corresponding to known reference content.

The example media content monitoring system 300 further includes a reporting unit 340 to receive the crediting results determined by the crediting unit 320. In an example implementation, the reporting unit 340 is implemented by the central facility processor 224 of FIG. 2, which is at a different location than the monitoring unit 124. In another example implementation, the reporting unit 340 is co-located with the example monitoring unit 124, or may be implemented in the same device as the example monitoring unit 124. The example reporting unit 340 can be configured to collate the received crediting results into any appropriate format for subsequent review and/or analysis. Additionally or alternatively, the example reporting unit 340 may perform post-processing on the crediting results to, for example, improve identification accuracy by combining (e.g., averaging) crediting results over time, combining crediting results with hint information provided by the example monitoring unit 124, etc.

While an example manner of implementing the media content monitoring system 300 as been illustrated in FIG. 3, one or more of the elements, processes and/or devices illustrated in FIG. 3 may be combined, divided, re-arranged, omitted, eliminated and/or implemented in any other way. Further, the example monitoring unit 124, the example media content receiver 310, the example crediting unit 320, the example database 330, the example reporting unit 340 and/or, more generally, the example media content monitoring system 300 of FIG. 3 may be implemented by hardware, software, firmware and/or any combination of hardware, software and/or firmware. Thus, for example, any of the example monitoring unit 124, the example media content receiver 310, the example crediting unit 320, the example database 330, the example reporting unit 340 and/or, more generally, the example media content monitoring system 300 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example media content monitoring system 300, the example monitoring unit 124, the example media content receiver 310, the example crediting unit 320, the example database 330 and/or the example reporting unit 340 are hereby expressly defined to include a tangible medium such as a memory, digital versatile disk (DVD), compact disk (CD), etc., storing such software and/or firmware. Further still, the example media content monitoring system 300 of FIG. 3 may include one or more elements, processes and/or devices in addition to, or instead of, those illustrated in FIG. 3, and/or may include more than one of any or all of the illustrated elements, processes and devices.

A block diagram of a first example implementation of the monitoring unit 124 of FIGS. 1, 2 and/or 3 is illustrated in FIG. 4. The example monitoring unit 124 of FIG. 4 includes an image pre-processor 405 to process video images obtained from a video input 410 configured to receive a video signal or video presentation provided by a media content receiver being monitored by the example monitoring unit 124 (e.g., such as the example media content receiver 310 of FIG. 3). For example, the video input 410 may be configured to accept a video signal carried by the example video connection 136 of FIG. 1. In such an example, the image pre-processor 405 may include an image capturing device, such as an image framegrabber, coupled to the video input 410 to capture images from the received video signal which are representative of the secondary media content presentation provided by the media content receiver being monitored. Additionally or alternatively, the video input 410 may be configured to accept captured video images provided by one or more of the example sensors 144 of FIG. 4. For example, as described above, one or more of the sensors 144 may include a camera coupled with an image capturing device, such as an image framegrabber, to capture images corresponding to the secondary media content presentation provided by the media content receiver being monitored.

In the illustrated example of FIG. 4, the image pre-processor 405 is configured to process the captured images obtained or derived from the video input 410 and representative of the secondary media content presentation being monitored by the monitoring unit 124. In particular, the example image pre-processor 405 operates to determine one or more regions of the captured images that correspond to primary media content included in the secondary media content presentation. The example image pre-processor 405 further operates to extract such region(s) for subsequent processing by a signature generator 415 included in the example monitoring unit 124 of the illustrated example. To potentially improve region determination accuracy, the example image pre-processor 405 determines synthetic images corresponding to the input captured images and utilizes such synthetic images when attempting to determine the one or more regions of the captured images that correspond to primary media content included in the secondary media content presentation. The synthetic images encode properties of the input captured images that can aid in region segmentation and selection as described in greater detail below.

To determine synthetic images corresponding to the input captured images, the example image pre-processor 405 includes an example synthetic image creator 420. The example synthetic image creator 420 accepts an input captured image representative of a monitored secondary media content presentation and determines a synthetic image encoding one or more properties exhibited by the captured image that can aid in image segmentation. In particular, the example synthetic image creator 420 divides the input captured image into a plurality of subregions for analysis. Each subregion may correspond to a respective individual pixel or group of pixels of the input captured image. After dividing the input captured image into the plurality of subregions, the example synthetic image creator 420 examines each subregion of the input captured image and encodes one or more properties of the examined subregion into a respective subregion of a synthetic image.

In the illustrated example, the properties encoded by the synthetic image creator 420 are inter-frame variations, such as directions of motion, differences (abrupt and/or gradual), etc., associated with each subregion of the captured image. In particular, for a particular input captured image, the example synthetic image creator 420 determines the inter-frame variation (e.g., inter-frame difference and/or motion) associated with each subregion of the input captured image and encodes each type of variation as a different color and/or pattern in the respective subregion of the determined synthetic image. For example, motion to the left, right, up and down may be represented in the generated synthetic image by different first, second, third and fourth colors and/or patterns, respectively. Additionally, a fifth color and/or pattern may be used to represent inter-frame differences not associated with motion, such as differences associated with the abrupt scene changes, gradual fading in and/or out of objects in a scene, etc. Additionally or alternatively, a sixth color and/or pattern may be used to represent the absence of motion and/or substantially no inter-frame difference associated with the particular subregion. Different techniques for determining inter-frame variation (e.g., differences and/or motion) associated with each subregion of the input captured image are described below in the context of an example implementation of the synthetic image creator 420 illustrated in FIG. 6. Examples of synthetic images that may be determined from input captured images are illustrated in FIGS. 7-10 and discussed in greater detail below.

To determine one or more regions of an input captured image that correspond to primary media content included in the monitored secondary media content presentation, the example image pre-processor 405 includes an example computer vision processor 425. The computer vision processor 425 of the illustrated example is configured to segment a synthetic image determined by the example synthetic image creator 420 from the input captured image into a plurality of regions using any appropriate edge detection, line detection, feature detection, feature extraction or similar technique, such as Canny edge detection, the generalized Hough transform, etc., to detect edges in the synthetic image. Accordingly, each segmented region of the synthetic image is made up of one or more connected subregions (e.g., pixels or group of pixels) that were encoded to represent the variation (e.g., inter-frame differences and/or motion) associated with the corresponding one or more subregions of the input captured image.

Figure 11:
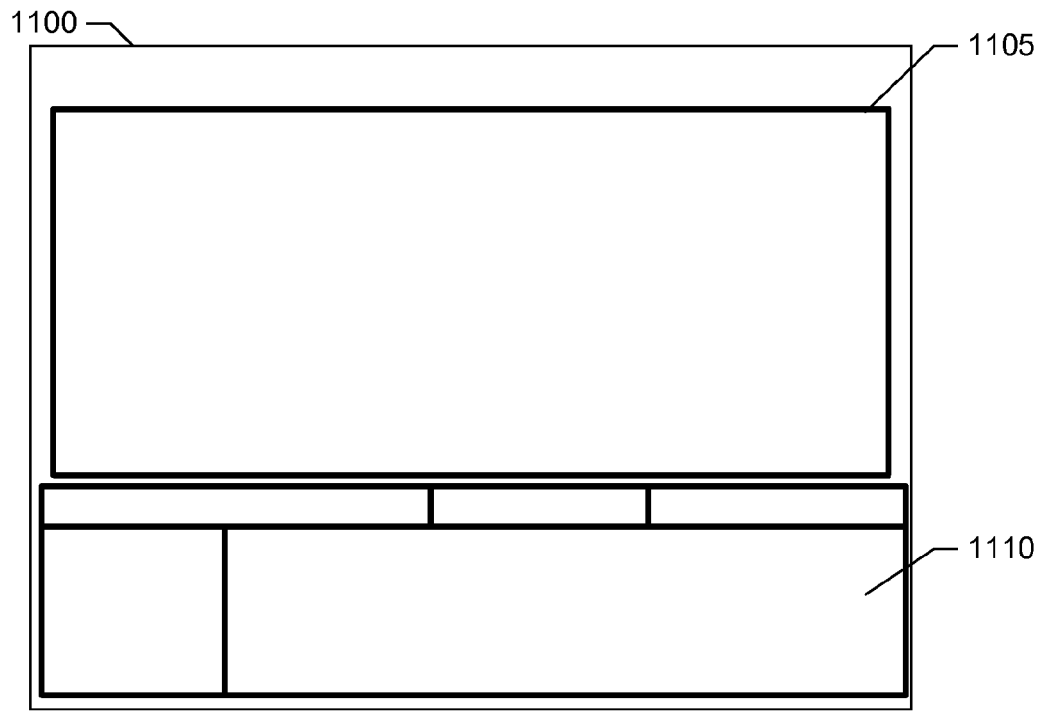
FIG. 11 illustrates a first example stored profile representative of a first possible secondary media content presentation layout.
Figure 12:
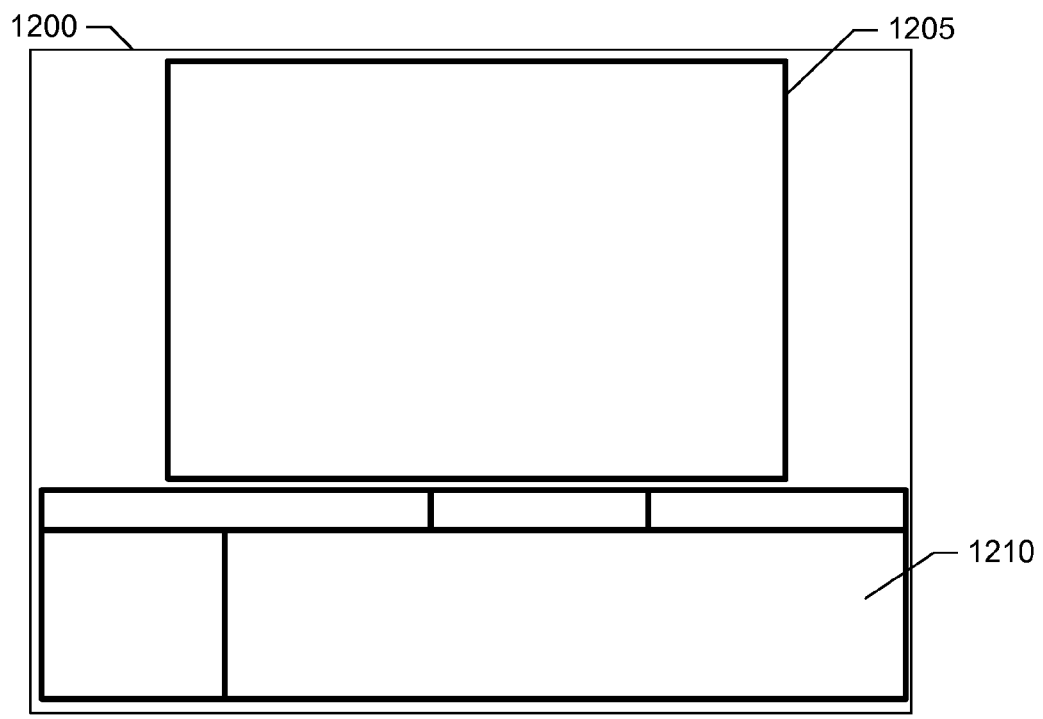
FIG. 12 illustrates a second example stored profile representative of a second possible secondary media content presentation layout.

After segmenting the synthetic image, the example computer vision processor 425 operates to select one or more of the segmented regions that correspond to the primary media content included in the monitored secondary media content presentation represented by the synthetic image. For example, multiple regions may be selected in operating scenarios in which primary content (from the same or different sources) is displayed in multiple different regions of the secondary media content presentation. In the illustrated example, the computer vision processor 425 implements two region selection techniques: stored profile region selection and automatic region selection. A particular example implementation of the computer vision processor 425 can include either one or both of the stored profile region selection and/or automatic region selection. The stored profile region selection technique utilizes one or more stored profiles maintained in a stored profile database 430. Each stored profile is a template of regions representative of a possible secondary media content presentation layout. For example, a stored profile may include one or more regions known to correspond to primary media content (e.g., such as a movie, television program, commercial, etc.) and one or more regions corresponding to other secondary media content (e.g., such as a ticker, a program guide, a menu, a station logo, etc.). To select a segmented region corresponding to the primary media content using the stored profile region selection techniques, the example computer vision processor 425 correlates or otherwise compares the segmented synthetic image with the stored profile(s) maintained in the example stored profile database 430. If a stored profile is determined to match the segmented synthetic image, the example computer vision processor 425 selects the region(s) of the segmented synthetic image corresponding to the primary media content as specified by the matching stored profile. However, if none of the stored profiles yield a match, the example computer vision processor 425 then performs the automatic region selection technique. Additionally or alternatively, when no match is found, the example computer vision processor 425 indicates that an operator will need to examine the segmented synthetic image and perform manual region selection and/or create a new stored profile corresponding to the segmented synthetic image being analyzed. Examples of stored profiles are illustrated in FIGS. 11-12 and discussed in greater detail below.

To perform automatic region selection, the example computer vision processor 425 characterizes the overall variation (e.g., inter-frame differences and/or motion) associated with each segmented region of the synthetic image. In the illustrated example, the computer vision processor 425 characterizes each region as exhibiting substantially uniform variation, substantially non-uniform variation or substantially no variation depending on the inter-frame variation (e.g., inter-frame differences and/or motion) encoded into each subregion of the region being characterized. For example, regions associated with tickers and other types of scrolling text or images will likely be characterized as exhibiting substantially uniform variation (e.g., motion) in the direction of the scrolling text or images. Regions associated with menus and other types of static text or image displays (e.g., such as station logos), as well as fixed regions associated with letterboxing or pillarboxing used in aspect ration conversion, will likely be characterized as exhibiting substantially no variation. However, regions associated with primary media content (e.g., such as movies, television programs, commercials, etc.) will likely be characterized as exhibiting substantially non-uniform variation because such content often includes multiple subregions each exhibiting inter-frame differences and/or motion in different directions relative to each other, as well as subregions exhibiting substantially no difference and/or motion. As such, the example computer vision processor 425 selects regions characterized as exhibiting non-uniform variation as corresponding to the primary media content included in the monitored secondary media content presentation and excludes the other regions of the segmented synthetic image (at least for the purpose of selecting regions corresponding to the primary media content). Examples of segmented synthetic images and associated image variation characterization are illustrated in FIGS. 8 and 10 and discussed in greater detail below.

After selecting a region of the segmented synthetic image potentially corresponding to the primary media content included in the monitored secondary media content presentation, the example computer vision processor 425 then operates to extract a corresponding region from the input captured image for subsequent processing to identify the primary media content. For example, if the selected region was determined using stored profile region selection, the selected region is known to correspond to primary media content as specified by the matching stored profile. As such, the example computer vision processor 425 extracts the region of the input captured image that corresponds with (e.g., overlays) the selected region of the segmented synthetic image. However, if the selected region was determined using automatic region selection, the example computer vision processor 425 determines whether the selected region is consistent with a display of primary media content before extracting the corresponding region from the input captured image. For example, the computer vision processor 425 may examine the selected region of the segmented image to determine whether its shape corresponds to a predefined shape consistent with a display of primary media content, such as rectangular shape having a minimum size and an aspect ratio of 4:3 or 16:9 consistent with a typical movie, television program or commercial display. If the selected region of the synthetic image is determined to match the predefined shape consistent with the display of primary media content, the example computer vision processor 425 then extracts the region of the input captured image that corresponds with (e.g., overlays) the selected region of the segmented synthetic image. The example computer vision processor 425 performs such region extraction for each selected region corresponding to primary media content included in the secondary media content presentation.

Although the example computer vision processor 425 has been described in the context of processing synthetic images determined by the example synthetic image creator 420, the example computer vision processor 425 can additionally or alternatively segment and select region(s) from the raw captured images corresponding to the monitored secondary media content presentation instead. For example, the computer vision processor 425 may be configured to segment and select region(s) of the raw captured images, or differences of successive raw captured images for use in determining inter-frame variations, obtained via the video input 410 when the example synthetic image creator 420 is not included or configured in a particular example implementation. The example computer vision processor 425 can also be configured to process digital image data corresponding to downloaded digital data files, received digital data streams, etc., instead of, or in addition to, images obtained from video signals, captured images, etc.

Returning to FIG. 4, the example computer vision processor 425 provides the extracted region(s) of the input captured image, which correspond to the primary media content included in the monitored secondary media content presentation, to the example signature generator 415. The example signature generator 415 generates one or more video signatures corresponding to the primary media content included in the monitored secondary media content presentation from the extracted region(s) of the input captured image provided by the example computer vision processor 425. In the illustrated example, each video signature is a small (e.g., 16 byte) numeric fingerprint generated by examining the pixels in the extracted region of the input captured image. Any technique for generating video signatures may be used to implement the example signature generator 415. Furthermore, although each signature may not unique identify particular primary media content, successive signatures generated from the extracted regions of successive captured images together form a set of signatures that can uniquely represent particular primary media content.

The example signature generator 415 sends the generated video signature(s) corresponding to the primary media content to the example crediting unit 320. As discussed above in connection with FIG. 3, the example crediting unit 320 is configured to compare the generated video signatures representative of the monitored primary media content to one or more reference signatures stored in the example database 330 and representative of a plurality of reference primary media content (e.g., such as movies, television programs, commercials, promotionals, infomercials, public service announcements, etc.). In the illustrated example, when a generated video signature representative of the monitored primary media content is determined to substantially match a reference signature, the example crediting unit 320 identifies the monitored primary media content as corresponding to the reference media content represented by the matching reference signature. (To improve identification accuracy, multiple signatures generated from extracted regions of successive captured images may be required to match a corresponding reference signature or set of signatures before the monitored primary media content is identified as corresponding to the matching reference media content.) If no match is detected, the example crediting unit 320 may output an indication that manual intervention is needed to identify the primary media content corresponding to the generated video signature(s) being processed. Because the example signature generator 415 generates the signature(s) from only the extracted region(s), each generated signature ideally corresponds to only the primary media content and is not corrupted or degraded by the other media content included in the monitored secondary media content presentation. Accordingly, such generated signature(s) can enable improved media content identification and/or commercial detection.

The example monitoring unit 124 of FIG. 4 further includes a hint detector 435 to process the video signatures generated by the example signature generator 415, as well as other information determined by the example image preprocessor 405, to improve the accuracy of identifying the primary media content included in the monitored secondary media content presentation. In particular, the hint detector 435 of the illustrated example includes a commercial hint event detector 440 and a commercial hint timing and decision processor 445 for use in commercial detection and verification applications when the primary media content of interest corresponds to broadcast commercials. The example commercial hint event detector 440 processes hint information associated with the extracted region(s) of the captured images determined to correspond to the primary media content included in the monitored secondary media content presentation to determine hints indicating whether the primary media content included in the monitored secondary media content corresponds to a broadcast commercial. Examples of such hint information includes video signatures generated by the example signature generator 415 from the extracted region(s) of the captured images, regions selected by the example computer vision processor 425 as corresponding to the primary content, and matched stored profiles as determined by the example computer vision processor 425.

For example, the commercial hint event detector 440 processes a video signature generated by the example signature generator 415 from an extracted region corresponding to the primary media content to determine whether the generated video signature matches a reference blank frame video signature. Generally, blank frames are inserted between commercial and non-commercial (e.g., movie, television program, etc.) content in a media broadcast. Reference video signatures may be determined for such blank frames to allow detection of the blank frames in a monitored media broadcast. However, in a secondary media content presentation, only the region corresponding to the primary media content may exhibit such blank frames, whereas the other regions of the secondary media content presentation may continue to present their respective secondary content (e.g., such as tickers, menus, etc.). Thus, even when a blank frame occurs in the region corresponding to the primary media content, signatures generated from the entire secondary media content presentation may not match the reference blank frame signatures because the secondary media content presentation does not become completely blank. Thus, the example commercial hint detector 440 processes the signatures generated from the extracted regions corresponding to the primary media content, instead of the entire secondary media content presentation, because such regions can become completely blank when a blank frame occurs. If a generated signature matches the reference blank frame signature, the example commercial hint detector 440 outputs a hint indicating that a blank frame was detected and that the immediately preceding or following primary media content may correspond to a broadcast commercial.

The commercial hint event detector 440 of the illustrated example also process the regions of the synthetic image selected by the example computer vision processor 425 as corresponding to the primary media content included in the monitored secondary media content presentation. For example, the computer vision processor 425 is configured to output information describing the location and size of the selected region of the synthetic image corresponding to the primary media content. The example commercial hint event detector 440 processes the descriptive information for regions selected from successive synthetic images to determine whether the shapes of the selected regions change in a manner indicative of a commercial being inserted into the presentation of non-commercial media content. For example, some non-commercial media content presentations may have aspect ratios of 16:9 corresponding to a widescreen movie of high-definition television (HDTV) presentation. However, commercials are typically presented in a format having a 4:3 aspect ratio. Thus, the example commercial hint event detector 440 processes the descriptive information for regions selected from successive synthetic images to determine whether the shape has changed from a first predefined shape (e.g., such as a rectangle having an aspect ratio of 16:9) to a second predefined shape (e.g., such as a rectangle having an aspect ration of 4:3). If such a shape change for regions selected from successive synthetic images is detected, the example commercial hint detector 440 outputs a hint indicating that a transition from a presentation of non-commercial content to a presentation of a commercial may have occurred.

Additionally, the commercial hint event detector 440 of the illustrated example processes stored profiles determined by the example computer vision processor 425 as matching the segmented synthetic images corresponding to the monitored secondary media content presentation. For example, the computer vision processor 425 is configured to output information describing/identifying the stored profile determined to match each segmented synthetic image. The example commercial hint event detector 440 compares the stored profiles that matched successive segmented synthetic images to determine whether the layout of the monitored secondary media content presentation has changed in a manner indicative of a commercial being inserted into the presentation of non-commercial media content. For example, the commercial hint event detector 440 processes the descriptive information for matching stored profiles to determine whether a first stored profile having a primary content region with a 16:9 aspect ratio matches a first synthetic image, and then a second stored profile having a primary content region with a 4:3 aspect ratio matches a subsequent second synthetic image. If such a change in matching stored profiles occurs, the example commercial hint event detector 440 outputs a hint indicating that a change in matching stored profiles cause by insertion of a commercial in the primary media content region may have occurred.

The example commercial hint timing and decision processor 445 collates the hint event information determined by the example commercial hint event detector 440 to determine when the primary media content included in the monitored secondary media content presentation may correspond to presentation of a commercial. For example, if the commercial hint timing and decision processor 445 receives a hint indication that a selected region change or a matched profile change occurred and a blank frame was detected during the change, the example commercial hint timing and decision processor 445 outputs timing information and an indication that a boundary between presentations of non-commercial content and commercial content occurred at the indicated time. The example commercial hint timing and decision processor 445 provides such hint information to the example crediting unit 320 to augment identification of the primary media content included in the monitored secondary media content presentation.

Although depicted as being included in the example monitoring unit 124, any or all of the example hint detector 435, the example commercial hint event detector 440 and/or the example commercial hint timing and decision processor 445 may be implemented separately from the example monitoring unit 124, such as in the example central facility 211 of FIG. 2. Also, some or all of the hints determined by the example hint detector 435 (e.g., such as the hints indicating that a presentation has a certain aspect ratio, occurrence of a blank frame, etc.) may also be used to improve the accuracy of identifying program content, such as television programs, movies, etc.

While a first example manner of implementing the example monitoring unit 124 of FIGS. 1, 2 and/or 3 has been illustrated in FIG. 4, one or more of the elements, processes and/or devices illustrated in FIG. 4 may be combined, divided, re-arranged, omitted, eliminated and/or implemented in any other way. Further, the example image pre-processor 405, the example signature generator 415, the example synthetic image creator 420, the example computer vision processor 425, the example stored profile database 430, the example hint detector 435, the example commercial hint event detector 440, the example commercial hint timing and decision processor 445 and/or, more generally, the example monitoring unit 124 of FIG. 4 may be implemented by hardware, software, firmware and/or any combination of hardware, software and/or firmware. Thus, for example, any of the example image pre-processor 405, the example signature generator 415, the example synthetic image creator 420, the example computer vision processor 425, the example stored profile database 430, the example hint detector 435, the example commercial hint event detector 440, the example commercial hint timing and decision processor 445 and/or, more generally, the example monitoring unit 124 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example monitoring unit 124, the example image pre-processor 405, the example signature generator 415, the example synthetic image creator 420, the example computer vision processor 425, the example stored profile database 430, the example hint detector 435, the example commercial hint event detector 440 and/or the example commercial hint timing and decision processor 445 are hereby expressly defined to include a tangible medium such as a memory, digital versatile disk (DVD), compact disk (CD), etc., storing such software and/or firmware. Further still, the example monitoring unit 124 of FIG. 4 may include one or more elements, processes and/or devices in addition to, or instead of, those illustrated in FIG. 4, and/or may include more than one of any or all of the illustrated elements, processes and devices.

A block diagram of a second example implementation of the monitoring unit 124 of FIGS. 1, 2 and/or 3 is illustrated in FIG. 5. The second example implementation of the monitoring unit 124 illustrated in FIG. 5 includes at least some elements in common with the first example implementation of the monitoring unit 124 illustrated in FIG. 4. As such, like elements in FIGS. 4 and 5 are labeled with the same reference numerals. The detailed descriptions of these like elements are provided above in connection with the discussion of FIG. 4 and, in the interest of brevity, are not repeated in the discussion of FIG. 5.

Turning to FIG. 5, the second example implementation of the monitoring unit 124 illustrated therein includes the example image pre-processor 405, the example synthetic image creator 420, the example computer vision processor 425, the example stored profile database 430, the example hint detector 435, the example commercial hint event detector 440 and the example commercial hint timing and decision processor 445 described above in connection with example implementation FIG. 4. However, instead of including the example signature generator 415, the second example implementation of the monitoring unit 124 of FIG. 5 includes an example watermark extractor 505. The example watermark extractor 505 is configured to receive the extracted region(s) of the input captured image, which correspond to the primary media content included in the monitored secondary media content, from the example computer vision processor 425. The example watermark extractor 505 then processes a received extracted region to extract one or more watermarks embedded in the primary media content included in the extracted region. The extracted watermark may include one or more identifiers that may be used to identify the primary media content into which the watermark was embedded. The example watermark extractor 505 can be adapted to support any appropriate technique for extracting watermarks embedded into video or image content.

As discussed above, the example watermark extractor 505 provides the extracted watermark(s) to the example crediting unit 320. In the illustrated example, the crediting unit 320 performs error detection and/or correction on the extracted watermark and then decodes the valid or corrected watermarks to obtain any program content identification information carried by the watermarks. Additionally or alternatively, the example crediting unit 320 may compare the extracted watermarks to one or more reference watermarks stored in the example database 330 and corresponding to known reference content. If a match is found, the example crediting unit 320 identifies the primary media content included in the monitored secondary media content as corresponding to the reference media content represented by the matching reference watermark.

While a second example manner of implementing the example monitoring unit 124 of FIGS. 1, 2 and/or 3 has been illustrated in FIG. 5, one or more of the elements, processes and/or devices illustrated in FIG. 5 may be combined, divided, re-arranged, omitted, eliminated and/or implemented in any other way. Further, the example image pre-processor 405, the example synthetic image creator 420, the example computer vision processor 425, the example stored profile database 430, the example hint detector 435, the example commercial hint event detector 440, the example commercial hint timing and decision processor 445, the example watermark extractor 505 and/or, more generally, the example monitoring unit 124 of FIG. 5 may be implemented by hardware, software, firmware and/or any combination of hardware, software and/or firmware. Thus, for example, any of the example image pre-processor 405, the example synthetic image creator 420, the example computer vision processor 425, the example stored profile database 430, the example hint detector 435, the example commercial hint event detector 440, the example commercial hint timing and decision processor 445, the example watermark extractor 505 and/or, more generally, the example monitoring unit 124 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example monitoring unit 124, the example image pre-processor 405, the example synthetic image creator 420, the example computer vision processor 425, the example stored profile database 430, the example hint detector 435, the example commercial hint event detector 440, the example commercial hint timing and decision processor 445 and/or the example watermark extractor 505 are hereby expressly defined to include a tangible medium such as a memory, digital versatile disk (DVD), compact disk (CD), etc., storing such software and/or firmware. Further still, the example monitoring unit 124 of FIG. 5 may include one or more elements, processes and/or devices in addition to, or instead of, those illustrated in FIG. 5, and/or may include more than one of any or all of the illustrated elements, processes and devices.

Figure 6:
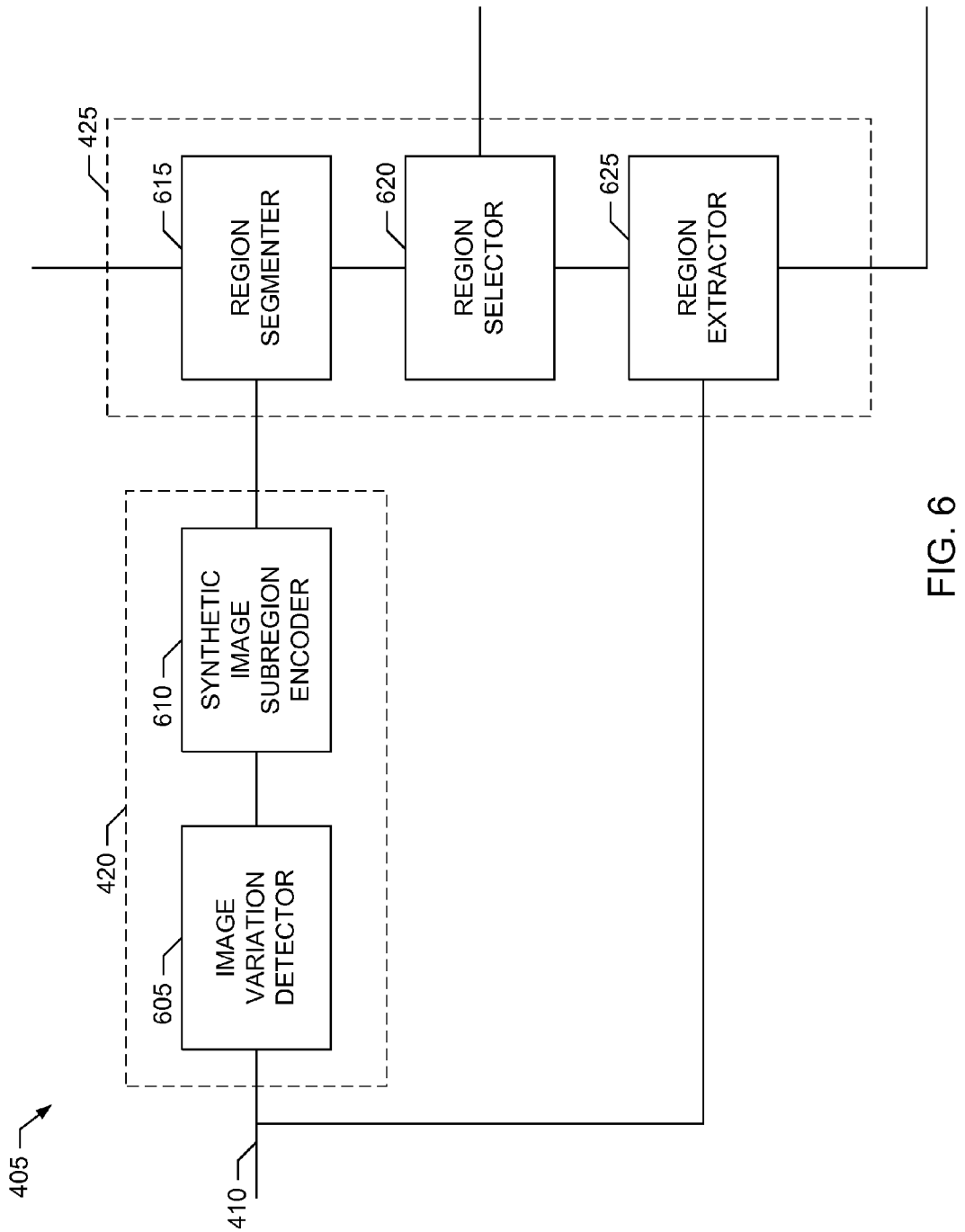
FIG. 6 is a block diagram of an example image pre-processor that may be used to implement the example media content monitoring units of FIGS. 4 and/or 5.

A block diagram of an example implementation of the image pre-processor 405 of FIGS. 4 and/or 5 is illustrated in FIG. 6. The example image pre-processor 405 of FIG. 6 includes the example synthetic image creator 420 and the example computer vision processor 425 described above in connection with FIGS. 4 and 5. Additionally, in the illustrated example of FIG. 6, the synthetic image creator 420 further includes an image variation detector 605 and a synthetic image subregion encoder 610. Furthermore, in the illustrated example of FIG. 6, the computer vision processor 425 includes a region segmenter 615, a region selector 620 and a region extractor 625.

The example image variation detector 605 is included in the example synthetic image creator 420 of FIG. 6 to determine inter-frame variation (e.g., difference and/or motion) associated with each subregion of the input captured image obtained via the example video input 410 and representative of the monitored secondary media content presentation. For example, the example image variation detector 605 divides the input captured image into a plurality of subregions, with each subregion corresponding to a pixel or predefined grouping of pixels. The example image variation detector 605 then determines the inter-frame variation (e.g., difference and/or motion) associated with each subregion of the input captured image. In an example implementation, the example image variation detector 605 determines such inter-frame variation by comparing the subregions of the current input captured image with the corresponding subregions of one or more previous input captured image. Any appropriate image processing technique for determining variation (e.g., difference and/or motion) from successive capture images of a video presentation may be used to perform such a comparison. In another example implementation, the example image variation detector 605 determines the inter-frame variation of each subregion of the captured by extracting information indicative of inter-frame variation from the encoded video stream providing the secondary media content presentation. Examples of such information include MPEG motion vectors that may be used to determine the motion associated with a particular subregion, and static macroblocks that may be used to determine the absence of motion in a particular subregion.

Either approach for inter-frame variation (e.g., difference and/or motion) determination may be used depending upon the particular application. For example, the successive image frame comparison approach may be used to determine inter-frame variation for analog or digital media content. The information extraction approach is applicable primarily to digital media content, but does not require the buffering and comparison of successive image frames.

Returning to FIG. 6, the example synthetic image subregion encoder 610 is included in the example synthetic image creator 420 of FIG. 6 to create a synthetic image representative of the inter-frame variation (e.g., difference and/or motion) associated with the subregions of input captured image as determined by the example image variation detector 605. For example, the synthetic image subregion encoder 610 takes the inter-frame variation determination made by the example image variation detector 605 for each subregion of the input captured image and encodes the determined variation (e.g., difference and/or motion) as a particular color and/or pattern in the respective subregion of the determined synthetic image. The particular encoded color and/or pattern used for a particular subregion of the determined synthetic image depends upon the type of variation detected in the respective subregion of the input captured image. For example, the example synthetic image subregion encoder 610 may represent motion to the left, right, up and down in a subregion of the generated synthetic image by different first, second, third and fourth colors and/or patterns, respectively. Additionally, a fifth color and/or pattern may be used to represent inter-frame differences not associated with motion, such as differences associated with the abrupt scene changes, gradual fading in and/or out of objects in a scene, etc. Additionally or alternatively, a sixth color and/or pattern may be used to represent the absence of motion and/or substantially no inter-frame difference associated with the particular subregion. Examples of synthetic images that may be determined from input captured images are illustrated in FIGS. 7-10 and discussed in greater detail below.

The example computer vision processor 425 of FIG. 6 includes the example region segmenter 615 to segment a synthetic image determined by the example synthetic image subregion encoder 610 into a plurality of regions. In the illustrated example, the region segmenter 615 implements any appropriate edge detection, line detection, feature detection, feature extraction or similar technique, such as Canny edge detection, the generalized Hough transform, etc., to detect edges in the synthetic image. Because the synthetic image is made up of subregions each encoded to represent a particular inter-frame variation (e.g., difference and/or motion), the detected edges will correspond to boundaries between different types of inter-frame variation. Accordingly, each segmented region of the synthetic image corresponds to one or more connected subregions (e.g., pixels or group of pixels) that together exhibit one of the following characteristics: (1) variation (e.g., motion) in a substantially uniform direction, (2) substantially no variation, or (3) substantially non-uniform variation (e.g., substantially non-uniform differences and/or motion) but which are bounded by regions exhibiting either variation (e.g., motion) in a substantially uniform direction or substantially no variation.

The example region selector 620 is included in the example computer vision processor 425 of FIG. 6 to select one or more of the segmented regions of the synthetic image that correspond to the primary media content included in the monitored secondary media content presentation represented by the synthetic image. In the illustrated example, the region selector 620 implements the two region selection techniques described above in connection with FIG. 4: stored profile region selection and automatic region selection. As described above, the example region selector 620 compares the segmented synthetic image to one or more stored profiles representative of possible secondary media content presentation layouts. If a matching profile is found, the example region selector 620 selects the segmented region(s) corresponding to the template region(s) of the stored profile specified as corresponding to primary media content included in the monitored secondary media content presentation. If a matching profile is not found or no stored profiles are available, the example region selector 620 performs automatic region selection by characterizing the overall inter-frame variation (e.g., difference and/or motion) associated with each segmented region of the synthetic image as exhibiting substantially uniform variation, substantially no variation or substantially non-uniform variation. The example region selector 620 then selects the region(s) exhibiting substantially non-uniform variation and that are consistent with a primary media content display (e.g., such as being at least a certain minimum rectangular size with an aspect ration of 4:3 or 16:9) as corresponding to the primary media content included in the monitored secondary media content presentation.

The example computer vision processor 425 of FIG. 6 further includes the example region extractor 625 to extract one or more regions from the input captured image that correspond to the regions of the synthetic image selected by the example regions selector 620. Such extracted region(s) of the input captured image ideally represent only the primary media content and are not corrupted by the other (e.g., post-production) media content included the in the secondary media content presentation. In an example implementation, the region extractor 625 extracts a region of the input captured image by making a copy of the extracted region for use in subsequent processing to identify the associated primary media content. In another example implementation, the region extractor 625 extracts a region of the input captured image by specifying the coordinates of the extracted region and providing the coordinates to subsequent processing elements.

While an example manner of implementing the image pre-processor 405 of FIGS. 4 and/or 5 has been illustrated in FIG. 6, one or more of the elements, processes and/or devices illustrated in FIG. 6 may be combined, divided, re-arranged, omitted, eliminated and/or implemented in any other way. Further, the example synthetic image creator 420, the example computer vision processor 425, the example image variation detector 605, the example synthetic image subregion encoder 610, the example region segmenter 615, the example region selector 620, the example region extractor 625 and/or, more generally, the example image pre-processor 405 of FIG. 6 may be implemented by hardware, software, firmware and/or any combination of hardware, software and/or firmware. Thus, for example, any of the example synthetic image creator 420, the example computer vision processor 425, the example image variation detector 605, the example synthetic image subregion encoder 610, the example region segmenter 615, the example region selector 620, the example region extractor 625 and/or, more generally, the example image pre-processor 405 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example image pre-processor 405, the example synthetic image creator 420, the example computer vision processor 425, the example image variation detector 605, the example synthetic image subregion encoder 610, the example region segmenter 615, the example region selector 620 and/or the example region extractor 625 are hereby expressly defined to include a tangible medium such as a memory, digital versatile disk (DVD), compact disk (CD), etc., storing such software and/or firmware. Further still, the example image pre-processor 405 of FIG. 6 may include one or more elements, processes and/or devices in addition to, or instead of, those illustrated in FIG. 6, and/or may include more than one of any or all of the illustrated elements, processes and devices.

Examples of synthetic images that may be determined from corresponding input captured images are illustrated in FIGS. 7-10. In particular, FIG. 7 depicts a first example captured image 700 representative of a secondary media content presentation monitored by the example monitoring unit 124. FIG. 8 depicts a first example synthetic image 800 determined from the first example captured image 700 of FIG. 7 by the example monitoring unit 124. Similarly, FIG. 9 depicts a second example captured image 900 representative of different secondary media content presentation monitored by the example monitoring unit 124, and FIG. 10 depicts a corresponding second example synthetic image 1000 determined from the second example captured image 900 by the example monitoring unit 124.

Turning to FIG. 7, the first example captured image 700 includes a primary media content region 705 corresponding to the primary media content displayed in the monitored secondary media content presentation. The first example captured image 700 also includes menu regions 710, 715 and 720 displaying substantially static text corresponding to different menu fields of an electronic program guide (EPG) included in the monitored secondary media content presentation. The example captured image 700 further includes scrolling text regions 725 and 730 displaying text moving (e.g., scrolling) in an up direction and corresponding to channel and program name entries, respectively, of the EPG included in the monitored secondary media content presentation.

Using the techniques described above, the example monitoring unit 124 determines the first example synthetic image 800 of FIG. 8 from the first example captured image 700 of FIG. 7. The first example synthetic image 800 includes a first region 805 encoded to represent substantially non-uniform variation (e.g., motion in various directions, interspersed inter-frame differences, etc.), with the encoding representative of the variation associated with the primary media content displayed in the primary media content region 705 of the first example captured image 700. For simplicity, the substantially non-uniform variation (e.g., substantially non-uniform motion and/or difference) is represented as cross-hatching in the first region 805 of FIG. 8. However, in an actual implementation this region would likely include a random or semi-random arrangement of subregions encoded to represent the different variation in the different subregions of the primary media content displayed in the primary media content region 705 of the first example captured image 700.

The first example synthetic image 800 also includes a second region 810 encoded to represent substantially no variation, with the encoding representative of the substantially static menu regions 710, 715 and 720 of the first example captured image 700. In the illustrated example, the lack of variation in the menu regions 710, 715 and 720 of the first example captured image 700 is represented with a unique pattern in the second region 810 of the first example synthetic image 800. Additionally, because all the regions menu regions 710, 715 and 720 have similar variation (or lack of variation), motion encoding of the menu regions 710, 715 and 720 yields the single second region 810.

The first example synthetic image 800 further includes a third region 815 encoded to represent substantially uniform variation (e.g., motion) in the up direction, with the encoding representative of the scrolling text regions 725 and 730 of the first example captured image 700. In the illustrated example, the motion in the up direction in the scrolling text regions 725 and 730 of the first example captured image 700 is represented with a unique pattern in the third region 815 of the first example synthetic image 800. Additionally, because the scrolling text regions 725 and 730 have similar motion, motion encoding of the scrolling text regions 725 and 730 yields the single third region 815.

In an example operation, the monitoring unit 124 would segment the first example synthetic image 800 as described above to determine the three segmented regions 805, 810 and 815 as illustrated in FIG. 8. In the case of automatic region selection, the example monitoring unit 124 would then characterize the variation associated with each region and determine that region 805 has substantially non-uniform variation, region 810 has substantially no variation and region 815 has substantially uniform variation. Based on these characterizations, the example monitoring unit 124 would select region 805 as corresponding to the primary media content included in the monitored secondary media content presentation.

As another example, the second example captured image 900 of FIG. 9 includes a primary media content region 905 that includes the primary media content displayed in another monitored secondary media content presentation. The second example captured image 900 also includes a static graphic region 910 displaying a substantially static graphic image included in the monitored secondary media content presentation. The example captured image 900 further includes a ticker region 915 displaying text moving (e.g., scrolling) to the left and corresponding to a ticker displayed in the monitored secondary media content presentation.

Using the techniques described above, the example monitoring unit 124 determines the second example synthetic image 1000 of FIG. 10 from the second example captured image 900 of FIG. 9. The second example synthetic image 1000 includes a first region 1005 encoded to represent substantially non-uniform variation (e.g., motion in various directions, interspersed inter-frame differences, etc.), with the encoding representative of the variation associated with the primary media content displayed in the primary media content region 905 of the second example captured image 900. For simplicity, the substantially non-uniform variation (e.g., substantially non-uniform motion and/or difference) is represented as cross-hatching in the first region 1005 of FIG. 10. However, in an actual implementation this region would likely include a random or semi-random arrangement of subregions encoded to represent the different variation in the different subregions of the primary media content displayed in the primary media content region 905 of the second example captured image 900.

The second example synthetic image 1000 also includes a second region 1010 encoded to represent substantially no variation, with the encoding representative of the static graphic region 910 of the second example captured image 900. In the illustrated example, the lack of variation in the static graphic region 910 of the second example captured image 900 is represented with a unique pattern in the second region 1010 of the second example synthetic image 1000. The second example synthetic image 1000 further includes a third region 1015 encoded to represent substantially uniform variation (e.g., motion) to the left, with the encoding representative of the ticker region 915 of the second example captured image 900. In the illustrated example, the motion to the left in the ticker region 915 of the second example captured image 900 is represented with a unique pattern in the third region 1015 of the second example synthetic image 1000.

In an example operation, the monitoring unit 124 would segment the second example synthetic image 1000 as described above to determine the three segmented regions 1005, 1010 and 1015 as illustrated in FIG. 10. In the case of automatic region selection, the example monitoring unit 124 would then characterize the variation associated with each region and determine that region 1005 has substantially non-uniform variation, region 1010 has substantially no variation and region 1015 has substantially uniform variation. Based on these characterizations, the example monitoring unit 124 would select region 1005 as corresponding to the primary media content included in the monitored secondary media content presentation.

FIGS. 11 and 12 illustrate respective example stored profiles 1100 and 1200 that may be used by the example monitoring unit 124 to implement stored profile region selection and to also determine commercial detection hints. The example stored profile 1100 of FIG. 11 is representative of a secondary media content presentation layout including an EPG and primary media content formatted to have an aspect ratio of 16:9. As such, the example stored profile 1100 includes a first template region 1105 having an aspect ratio of 16:9 and specified as corresponding to where the primary media content would be displayed in the secondary media content presentation layout. The example stored profile 1100 includes a second template region 1110 specified as corresponding to where the EPG would be displayed in the secondary media content presentation layout, with the different fields of the EPG also represented in the second template region 1110.

The example stored profile 1200 of FIG. 12 is representative of a secondary media content presentation layout including an EPG and primary media content formatted to have an aspect ratio of 4:3. As such, the example stored profile 1200 includes a first template region 1205 having an aspect ratio of 4:3 and specified as corresponding to where the primary media content would be displayed in the secondary media content presentation layout. The example stored profile 1200 includes a second template region 1210 specified as corresponding to where the EPG would be displayed in the secondary media content presentation layout, with the different fields of the EPG also represented in the second template region 1210.

In an example stored profile region selection procedure, the monitoring unit 124 would compare a determined synthetic image, such as one of the first or second example synthetic images 800 and 1000 of FIGS. 8 and 10, respectively, to each of the example stored profiles 1100 and 1200. If a match occurred, then the example monitoring unit 124 would select the segmented region of the synthetic image corresponding to the template region of the matching stored profile specified as corresponding to displayed primary media content (e.g., such as the template region 1105 and 1205 of FIGS. 11 and 12, respectively).

Furthermore, commercials are typically displayed in an aspect ratio of 4:3. Accordingly, if the monitoring unit 124 detects that the stored profiles matching successive synthetic images corresponding to the monitored secondary media content presentation change from the example stored profile 1100 to the example stored profile 1200, the monitoring unit 124 could output a commercial detection hint indicating that a commercial may be being displayed in the primary content region due to the aspect ratio change from 16:9 to 4:3.

Flowcharts representative of example processes that may be executed to implement the example monitoring unit 124, the example media content monitoring systems 100, 200 and/or 300, the example media content receiver 310, the example crediting unit 320, the example database 330, the example reporting unit 340, the example image pre-processor 405, the example signature generator 415, the example synthetic image creator 420, the example computer vision processor 425, the example stored profile database 430, the example hint detector 435, the example commercial hint event detector 440, the example commercial hint timing and decision processor 445, the example watermark extractor 505, the example image variation detector 605, the example synthetic image subregion encoder 610, the example region segmenter 615, the example region selector 620 and/or the example region extractor 625 are shown in FIGS. 13-18. In these examples, the process represented by each flowchart may be implemented by one or more programs comprising machine readable instructions for execution by: (a) a processor, such as the processor 1912 shown in the example computer 1900 discussed below in connection with FIG. 19, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1912, but the entire program or programs and/or portions thereof could alternatively be executed by a device other than the processor 1912 and/or embodied in firmware or dedicated hardware (e.g., implemented by an application specific integrated circuit (ASIC), a programmable logic device (PLD), a field programmable logic device (FPLD), discrete logic, etc.). For example, any or all of the example monitoring unit 124, the example media content monitoring systems 100, 200 and/or 300, the example media content receiver 310, the example crediting unit 320, the example database 330, the example reporting unit 340, the example image pre-processor 405, the example signature generator 415, the example synthetic image creator 420, the example computer vision processor 425, the example stored profile database 430, the example hint detector 435, the example commercial hint event detector 440, the example commercial hint timing and decision processor 445, the example watermark extractor 505, the example image variation detector 605, the example synthetic image subregion encoder 610, the example region segmenter 615, the example region selector 620 and/or the example region extractor 625 could be implemented by any combination of software, hardware, and/or firmware. Also, some or all of the processes represented by the flowcharts of FIGS. 13-18 may be implemented manually. Further, although the example processes are described with reference to the flowcharts illustrated in FIGS. 13-18, many other techniques for implementing the example methods and apparatus described herein may alternatively be used. For example, with reference to the flowcharts illustrated in FIGS. 13-18, the order of execution of the blocks may be changed, and/or some of the blocks described may be changed, eliminated, combined and/or subdivided into multiple blocks.

Figure 13:
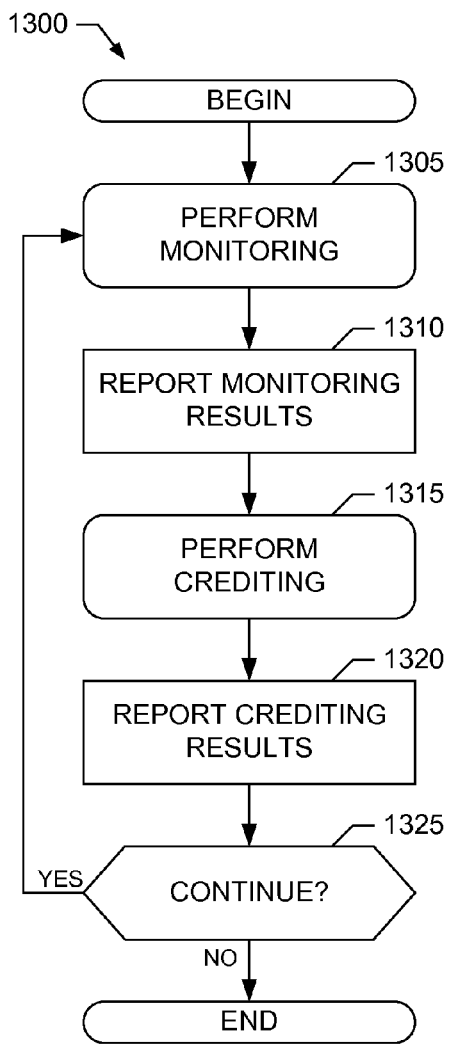
FIG. 13 is a flowchart representative of an example process that may be performed to implement the example media content monitoring systems of FIGS. 1, 2 and/or 3.
Figure 14:
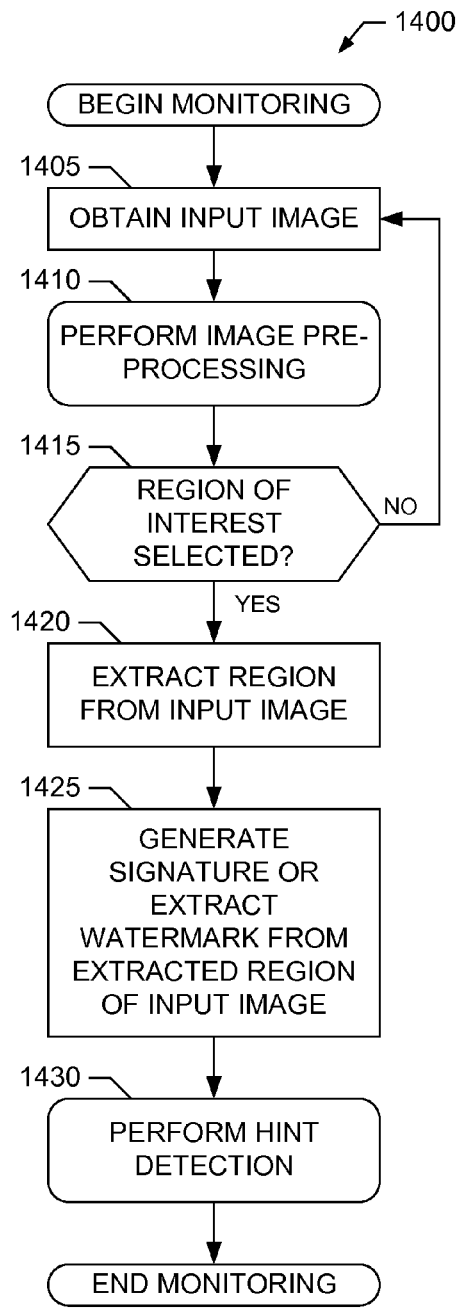
FIG. 14 is a flowchart representative of an example monitoring process that may be used to implement the example process of FIG. 13 and/or that may be executed to implement the example media content monitoring units of FIGS. 4 and/or 5.

An example process 1300 that may be executed to implement the example media content monitoring systems 100, 200 and/or 300 of FIGS. 1-3 is illustrated in FIG. 13. With reference to the example media content monitoring system 300 of FIG. 3, the example process 1300 begins execution at block 1305 at which the example monitoring unit 124 monitors primary media content included in a secondary media content presentation presented by the example media content receiver 310. For example, at block 1305 the monitoring unit 124 generates video signatures and/or extracts video watermarks representative of the primary media content included in the monitored secondary media content presentation. An example process that may be used to implement the processing at block 1305 is illustrated in FIG. 14 and described in greater detail below.

Next, control proceeds to block 1310 at which the example monitoring unit 124 reports its monitoring results to the example crediting unit 320. For example, if the example crediting unit 320 is at a different location than the example monitoring unit 124, at block 1310 the monitoring unit 124 includes the generated video signatures and/or extracted video watermarks, as well any additional hint information, in one or more viewing records encapsulated for transmission over any appropriate data connection. As another example, if the example crediting unit 320 is co-located with or implemented in the same device as the monitoring unit 124, at block 1310 the monitoring unit 124 passes the generated video signatures and/or extracted video watermarks, as well any additional hint information, via a bus and/or memory transfer to the crediting unit 320.

Figure 17:
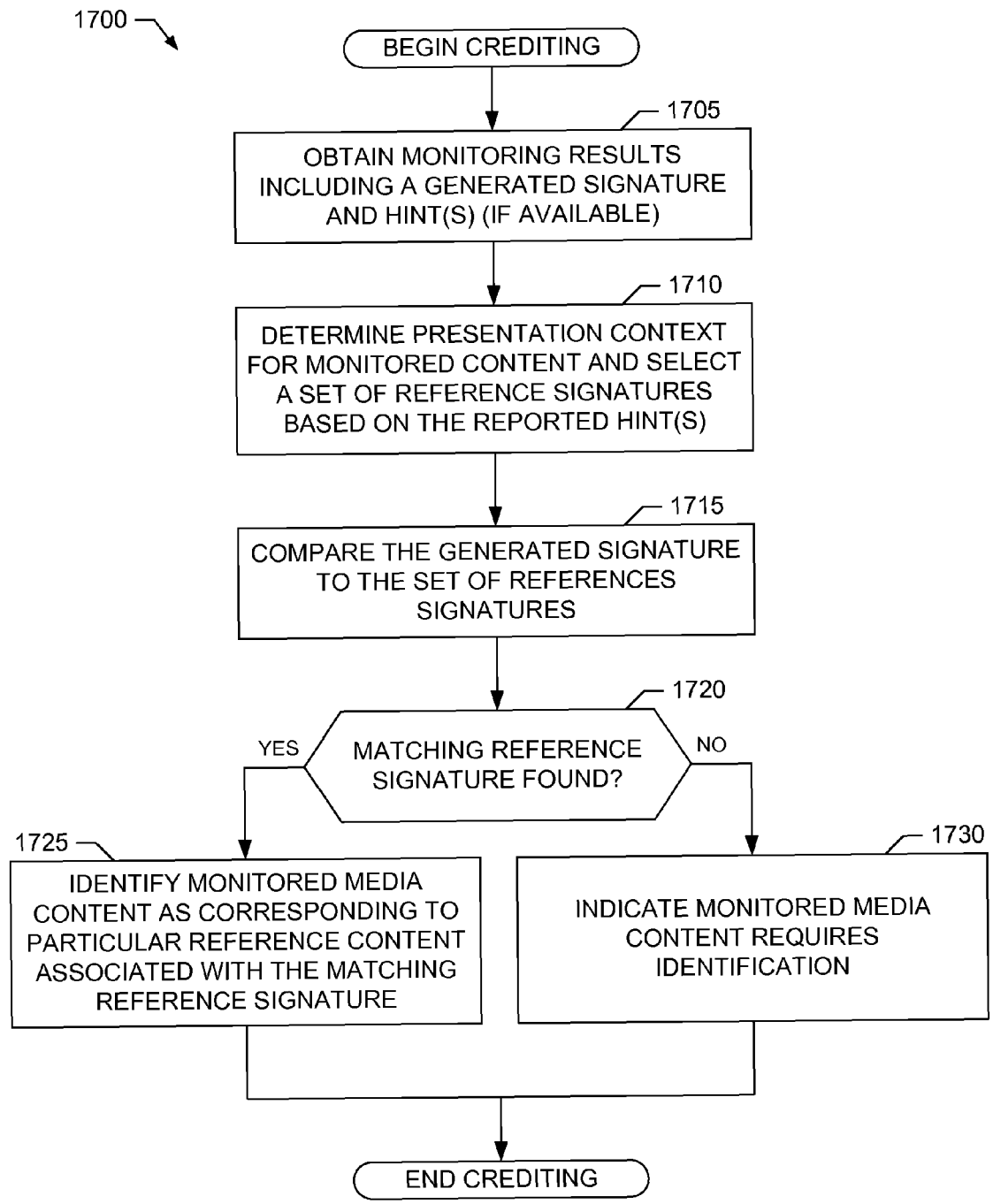
FIG. 17 is a flowchart representative of a first example crediting process that may be used to implement the example process of FIG. 13 and/or that may be executed to implement the example media content monitoring systems of FIGS. 1, 2 and/or 3.
Figure 18:
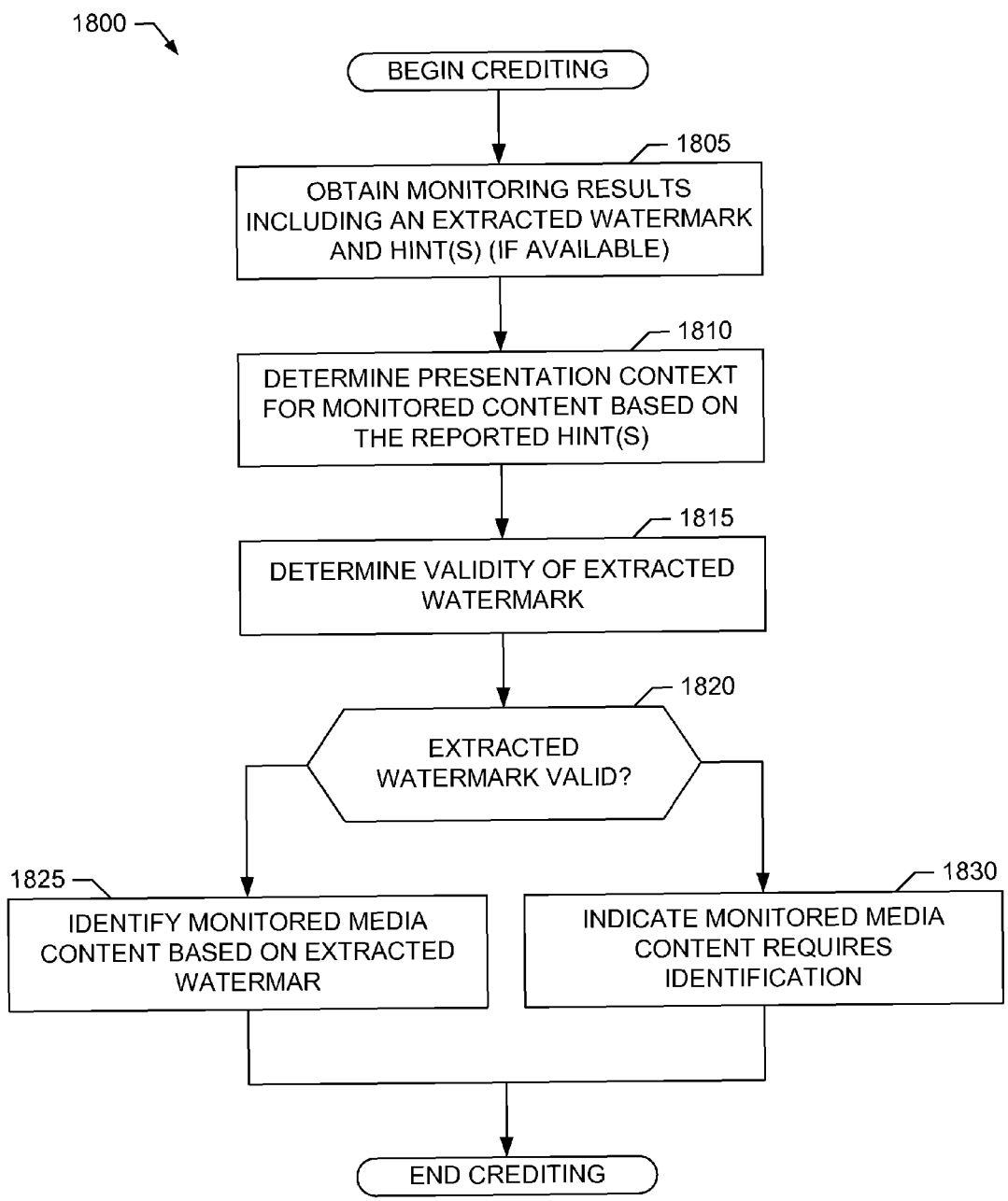
FIG. 18 is a flowchart representative of a second example crediting process that may be used to implement the example process of FIG. 13 and/or that may be executed to implement the example media content monitoring systems of FIGS. 1, 2 and/or 3.

Control then proceeds to block 1315 at which the example crediting unit 320 processes the monitoring results reported at block 1310 to identify the primary (media content included in the secondary media content presentation being monitored by the example monitoring unit 124. Example processes that may be used to implement the processing at block 1315 are illustrated in FIGS. 17-18 and described in greater detail below. Next, control proceeds to block 1320 at which the example reporting unit 340 reports the crediting results determined by the crediting unit 320. Additionally, at block 1320 the example reporting unit 340 may perform post-processing on the crediting results to, for example, improve identification accuracy by combining (e.g., averaging) crediting results over time, combining crediting results with hint information provided by the example monitoring unit 124, etc.

Next, control proceeds to block 1325 at which the example monitoring unit 124 determines whether monitoring of the example media content receiver 310 is to continue. If monitoring is to continue (block 1325), control returns to block 1305 and blocks subsequent thereto at which the example monitoring unit 124 continues monitoring the secondary media content presentation provided by the example media content receiver 310. However, if monitoring is not to continue (block 1325), execution of the example process 1300 ends.

Figure 15:
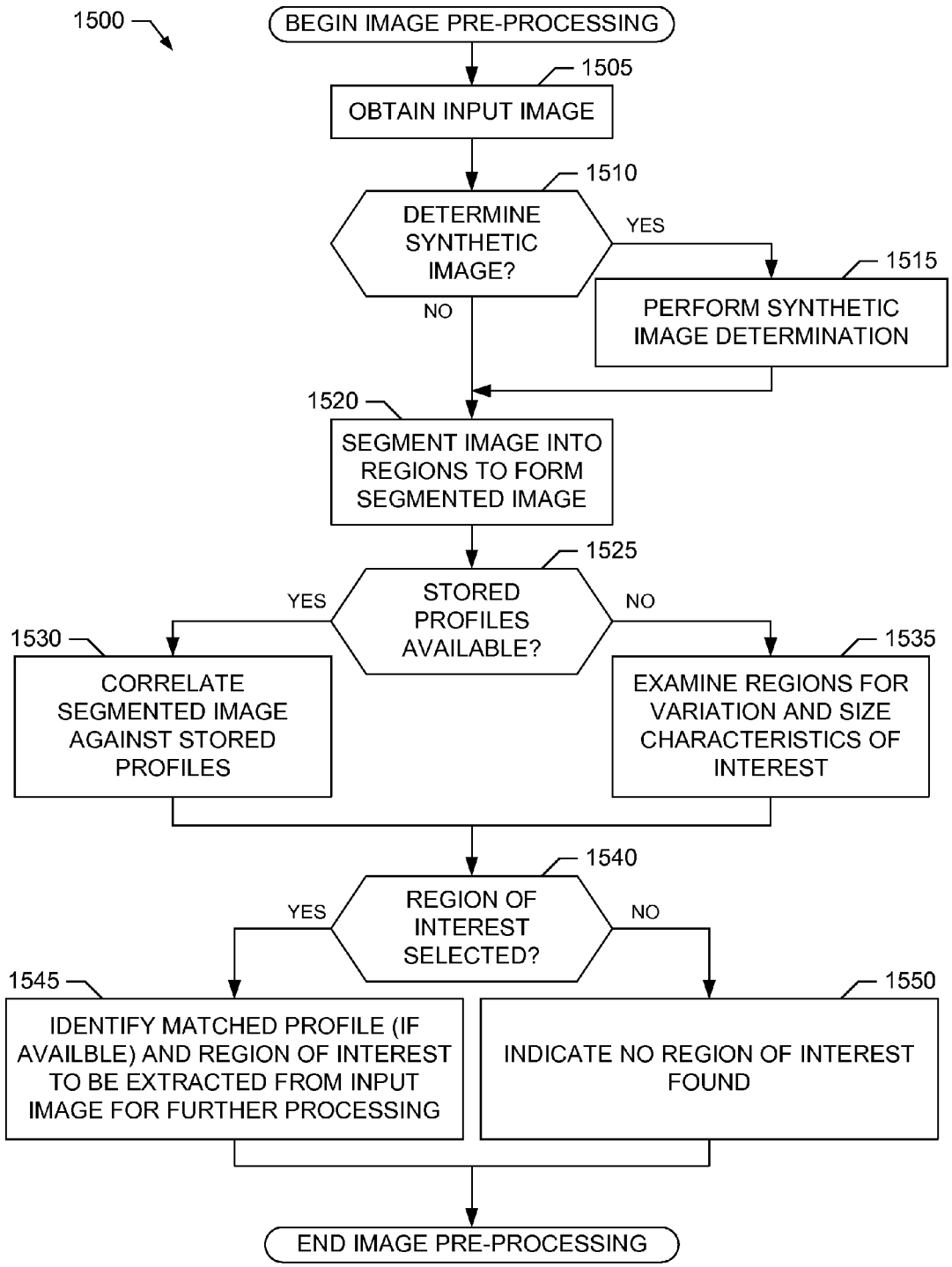
FIG. 15 is a flowchart representative of an example image pre-processing process that may be used to implement the example monitoring process of FIG. 14 and/or that may be executed to implement the example media content monitoring units of FIGS. 4 and/or 5.

An example monitoring process 1400 that may be used to implement the example monitoring unit 124 of FIGS. 1-6 and/or to perform the processing at block 1305 of FIG. 13 is illustrated in FIG. 14. With reference to the example monitoring unit 124 as illustrated in FIGS. 4-6, the example process 1400 of FIG. 14 begins execution at block 1405 at which the example monitoring unit 124 obtains an input captured image corresponding to the secondary media content presentation being monitored. Control then proceeds to block 1410 at which the example monitoring unit 124 performs pre-processing on the input captured image obtained at block 1405. For example, at block 1410 the example monitoring unit 124 determines a synthetic image having subregions encoded to represent the inter-frame variation (e.g., difference and/or motion) associated with corresponding subregions of the input captured image. Furthermore, at block 1410 the example monitoring unit 124 segments the determined synthetic image into regions and selects one or more regions corresponding to the primary media content included in the monitored secondary media content presentation. An example process that may be used to implement the image pre-processing at block 1410 is illustrated in FIG. 15 and described in greater detail below.

Next, control proceeds to block 1415 at which the example monitoring unit 124 determines whether a region corresponding to the primary content included in the monitored secondary media content presentation was selected at block 1410. If such a region was not selected (block 1415), control returns to block 1405 and blocks subsequent thereto at which the example monitoring unit 124 obtains a subsequent input captured image for processing. However, if the example monitoring unit 124 selected a region corresponding to the primary content included in the monitored secondary media content presentation (block 1415), control proceeds to block 1420. At block 1420, the example monitoring unit 124 extracts a region from the input captured image obtained at block 1405 that corresponds to the region of the synthetic image selected at block 1410. Control then proceeds to block 1425.

At block 1425, the extracted region of the input captured image is processed by the example signature generator 415 and/or the example watermark extractor 505 included in the example monitoring unit 124. For example, at block 1425 the example signature generator 415 generates a video signature corresponding to the primary media content included in the monitored secondary media content presentation from the extracted region of the input captured image obtained at block 1420. Additionally or alternatively, at block 1425 the example signature generator 415 processes the extracted region of the input captured image obtained at block 1420 to extract one or more watermarks embedded in the primary media content included in the extracted region.

Figure 16:
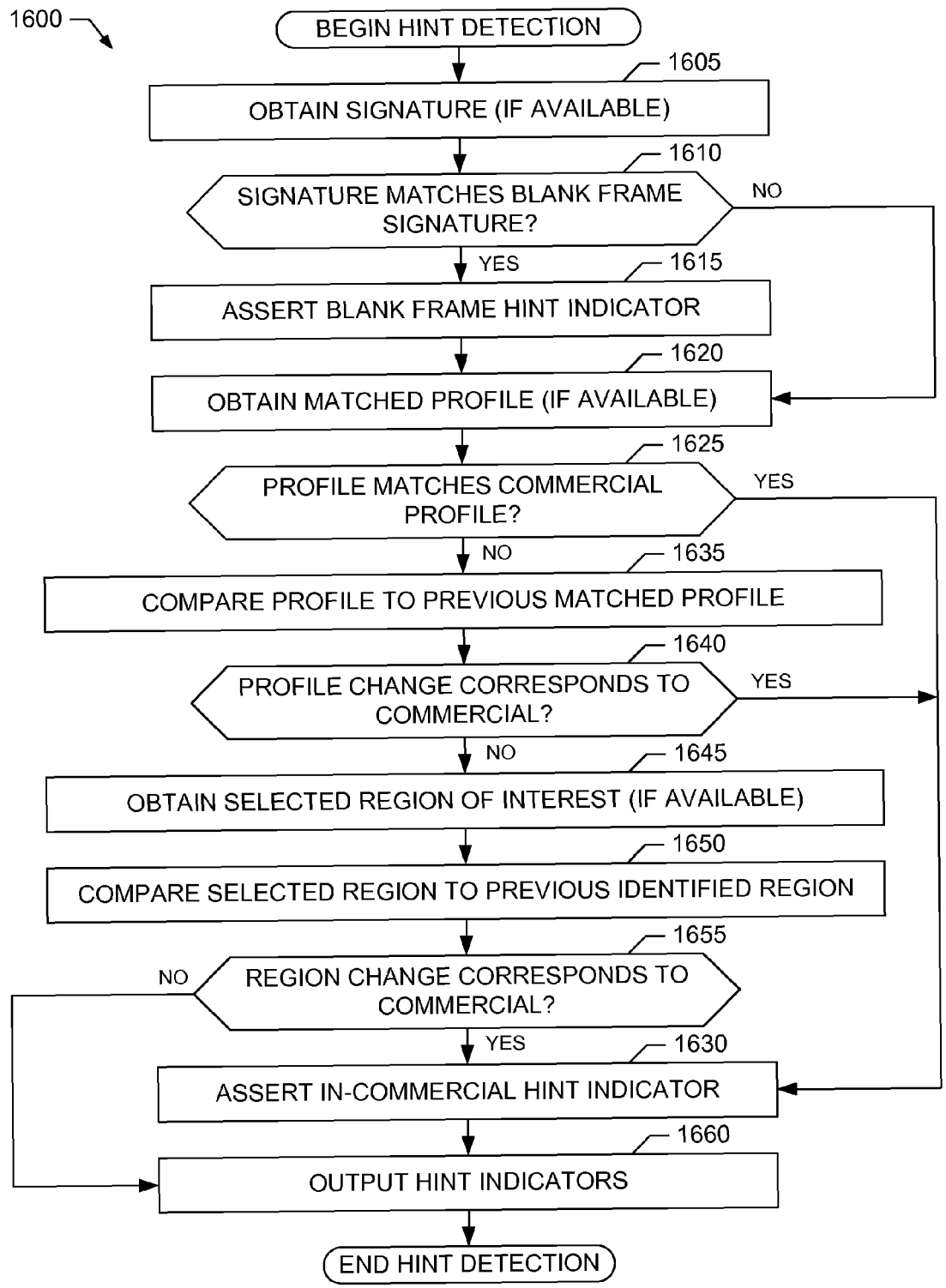
FIG. 16 is a flowchart representative of an example hint detection process that may be used to implement the example monitoring process of FIG. 14 and/or that may be executed to implement the example media content monitoring units of FIGS. 4 and/or 5.

Next, control proceeds to block 1430 at which the example monitoring unit 124 determines hint information that may be used to improve the accuracy of identifying the primary media content included in the monitored secondary media content presentation. An example process that may be used to implement hint detection at block 1430 is illustrated in FIG. 16 and described in greater detail below. After processing at block 1430 completes, execution of the example process 1400 ends.

An example image pre-processing process 1500 that may be used to implement the example image pre-processor 405 included in the example monitoring unit 124 of FIGS. 4-6 and/or to perform the processing at block 1410 of FIG. 14 is illustrated in FIG. 15. With reference to the example image pre-processor 405 as illustrated in FIGS. 4-6, the example process 1500 of FIG. 15 begins execution at block 1505 at which the example image pre-processor 405 obtains an input captured image representative of a monitored secondary media content presentation. Control then proceeds to block 1510 at which the example image pre-processor 405 determines whether a synthetic image is to be determined from the captured image obtained at block 1505. If a synthetic image is to be determined from the captured image (block 1510), control proceeds to block 1515.

At block 1515, the example image pre-processor 405 determines the synthetic image corresponding to the input captured image obtained at block 1505. For example, at block 1505 the example image pre-processor 405 divides the input captured into a plurality of subregions and determines the type of variation associated with each subregion using successive image frame comparison and/or variation (e.g., motion) information included in the encoded video stream providing the secondary media content presentation. Then, the example image pre-processor 405 encodes the inter-frame variation (e.g., inter-frame difference and/or motion) determination made for each subregion of the input captured image into a particular color and/or pattern in a corresponding subregion of the determined synthetic image.

After the synthetic image is determined at block 1515, or if the synthetic image is not supported by the particular implementation of the image pre-processor 405 (block 1510), control proceeds to block 1520. At block 1520, the example image pre-processor 405 segments the synthetic image determined at block 1515 (or the input captured image if synthetic image determination is not supported) into regions to form a segmented image. Assuming a synthetic image was determined at block 1515, at block 1520 the example image pre-processor 405 implements any appropriate edge detection, line detection, feature detection, feature extraction or similar technique, such as Canny edge detection, the generalized Hough transform, etc., to detect edges in the synthetic image. As discussed above, each segmented region of the synthetic image corresponds to one or more connected subregions (e.g., pixels or group of pixels) that together exhibit one of the following characteristics: (1) variation (e.g., motion) in a substantially uniform direction, (2) substantially no variation, or (3) substantially non-uniform variation (e.g., substantially non-uniform differences and/or motion) but which are bounded by regions exhibiting either variation (e.g., motion) in a substantially uniform direction or substantially no variation.

Control then proceeds to block 1525 at which the example image pre-processor 405 determines whether stored profiles are available for use in the selection of one or more regions of the segmented image that correspond to the primary media content included in the monitored secondary media content presentation. If stored profiles are available (block 1525), control proceeds to block 1530 at which the example image pre-processor 405 performs stored profile region selection and compares the segmented image to one or more stored profiles representative of possible secondary media content presentation layouts. However, if stored profiles are not available (block 1525), control proceeds to block 1535 at which the example image pre-processor 405 performs automatic region selection by characterizing the overall inter-frame variation associated with each segmented region of the synthetic image and selecting the region exhibiting substantially non-uniform variation that is consistent with a primary media content display (e.g., such as being at least a certain minimum rectangular size with an aspect ration of 4:3 or 16:9).

Next, at block 1540 the example image pre-processor 405 determines whether a region was selected at blocks 1530 or 1535 as corresponding to primary media content included in the monitored secondary media content presentation. If a region was selected as corresponding to the primary media content (block 1540), control proceeds to block 1545 at which the example image pre-processor 405 identifies the selected region of the synthetic image so that the corresponding region of the input captured image can be extracted. Additionally, at block 1545 the example image pre-processor 405 identifies the matching stored profile if the region was selected using stored profile region selection. However, if no region was selected as corresponding to the primary media content (block 1540), control proceeds to block 1550 at which the example image pre-processor 405 indicates that no region corresponding to primary media content was found. After processing at blocks 1545 or 1550 completes, execution of the example process 1500 ends.

An example hint detection process 1600 that may be used to implement the example hint detector 435 included in the example monitoring unit 124 of FIGS. 4-5 and/or to perform the processing at block 1430 of FIG. 14 is illustrated in FIG. 16. With reference to the example hint detector 435 as illustrated in FIGS. 4-5, the example process 1600 of FIG. 16 begins execution at block 1605 at which the example hint detector 435 obtains a video signature, if available, corresponding to primary media content included in a monitored secondary media content presentation. At block 1605, the video signature may be obtained from the example signature generator 415. Next, control proceeds to block 1610 at which the example hint detector 435 determines whether the obtained video signature matches a reference signature representative of a blank video frame. If the obtained video signature matches the reference blank frame signature (block 1610), control proceeds to block 1615 at which the example hint detector 435 asserts a blank frame hint indicator.

Next, control proceeds to block 1620 at which the example hint detector 435 obtains a matched stored profile if, for example, a stored profile representative of a possible secondary media content presentation layout was determined to match a monitored secondary media content presentation. Then, at block 1625 the example hint detector 435 determines whether the matched profile is a profile representative of a commercial presentation. If the matched profile is representative of a commercial presentation (block 1625), control proceeds to block 1630 at which the example hint detector 435 asserts an in-commercial hint indicator to indicate that the primary media content included in the monitored secondary media content presentation likely corresponds to commercial content. If, however, the matched profile is not representative of a commercial presentation (block 1625), control proceeds to block 1635.

At block 1635, the example hint detector 435 compares the current matched stored profile, if available, to a preceding matched stored profile, if available. Then, at block 1640 the example hint detector 435 determines whether there was a change in the matched stored profiles indicative of presentation of a commercial. For example, a change from a matched stored profile having a primary content region with an aspect ratio of 16:9 to a matched stored profile having a primary content region with an aspect ratio of 4:3 can indicate that a commercial is now being broadcast in the primary content region. If a matched profile change indicative of a commercial presentation is detected (block 1640), control proceeds to block 1630 at which the example hint detector 435 asserts the in-commercial hint indicator. However, if a matched profile change indicative of a commercial presentation is not detected (block 1640), control proceeds to block 1645.

At block 1645 the example hint detector 435 obtains a current region of selected as corresponding to primary media content included in the monitored secondary media content presentation. Then, at block 1650 the example hint detector 435 compares the current selected region of interest with a previously selected region of interest. Next, at block 1655 the example hint detector 435 determines whether there was a change in the selected regions indicative of a commercial presentation. (e.g., such as a change from a region with a 16:9 aspect ratio to a region with a 4:3 aspect ratio). If a region of interest selection change indicative of a commercial presentation is detected (block 1655), control proceeds to block 1630 at which the example hint detector 435 asserts the in-commercial hint indicator.

Next, control proceeds to block 1660 at which the example hint detector 435 outputs any asserted hint indicators. Execution of the example process 1600 then ends.

A first example crediting process 1700 that may be used to implement the example crediting unit 320 of FIGS. 3-5 and/or to perform the processing at block 1315 of FIG. 13 is illustrated in FIG. 17. With reference to the crediting unit 320 as illustrated in FIGS. 3-5, the example process 1700 of FIG. 17 begins execution at block 1705 at which the example crediting unit 320 obtains any generated signatures corresponding to primary media content included in a monitored secondary media content presentation as reported by the example monitoring unit 124. Additionally, at block 1705 the example crediting unit 320 obtains any additional hint information reported by the example monitoring unit 124.

Next, control proceeds to block 1710 at which the example crediting unit 320 uses the reported hint information to determine a presentation context for the primary media content corresponding to the reported video signatures. For example, at block 1710 the example crediting unit 320 uses one or more reported hint indicators to determine whether the primary media content corresponds to commercial content being presented during a break in a non-commercial content presentation. At block 1710 the example crediting unit 320 uses the determined presentation context to select a corresponding set of reference signatures to compare with the reported video signatures. For example, if the example crediting unit 320 determines that the monitored primary media content corresponds to a commercial, the crediting unit 320 selects a set of reference signatures corresponding to reference commercial content. Otherwise, the crediting unit 320 selects a set of reference signatures corresponding to reference non-commercial content.

Next, at block 1715 the example crediting unit 320 compares the reported video signature(s) obtained at block 1705 with the set of reference signatures selected block 1710. Then, at block 1720 the example crediting unit 320 determines whether a reported video signature matches a reference signature. If a match is found (block 1720), control proceeds to block 1725 at which the example crediting unit 320 identifies the monitored primary media content as corresponding to the reference primary media content represented by the matching reference signature. However, if no match is found (block 1720), control proceeds to block 1730 at which the example crediting unit 320 indicates that the monitored primary media content was not identifiable and, therefore, requires manual identification or identification through other techniques. Execution of the example process 1700 then ends.

A second example crediting process 1800 that may be used to implement the example crediting unit 320 of FIGS. 3-5 and/or to perform the processing at block 1315 of FIG. 13 is illustrated in FIG. 18. With reference to the crediting unit 320 as illustrated in FIGS. 3-5, the example process 1800 of FIG. 18 begins execution at block 1805 at which the example crediting unit 320 obtains any extracted watermarks corresponding to primary media content included in a monitored secondary media content presentation as reported by the example monitoring unit 124. Additionally, at block 1805 the example crediting unit 320 obtains any additional hint information reported by the example monitoring unit 124.

Next, control proceeds to block 1810 at which the example crediting unit 320 uses the reported hint information to determine a presentation context for the primary media content corresponding to the reported extracted watermark(s). For example, at block 1810 the example crediting unit 320 uses one or more reported hint indicators to determine whether the primary media content corresponds to commercial content being presented during a break in a non-commercial content presentation.

Next, at block 1815 the example crediting unit 320 determines the validity of the reported extracted watermark(s) obtained at block 1805 using any appropriate error detection/ correction technique. Then, at block 1820 the example crediting unit 320 determines whether a reported video watermark is valid. If a reported watermark is valid (block 1820), control proceeds to block 1825 at which the example crediting unit 320 identifies the monitored primary media content based on identification information included in the reported watermark and/or associated with a reference watermark matching the reported watermark. However, if no match is found (block 1820), control proceeds to block 1830 at which the example crediting unit 320 indicates that the monitored primary media content was not identifiable and, therefore, requires manual identification or identification through other techniques. Execution of the example process 1800 then ends.

Figure 19:
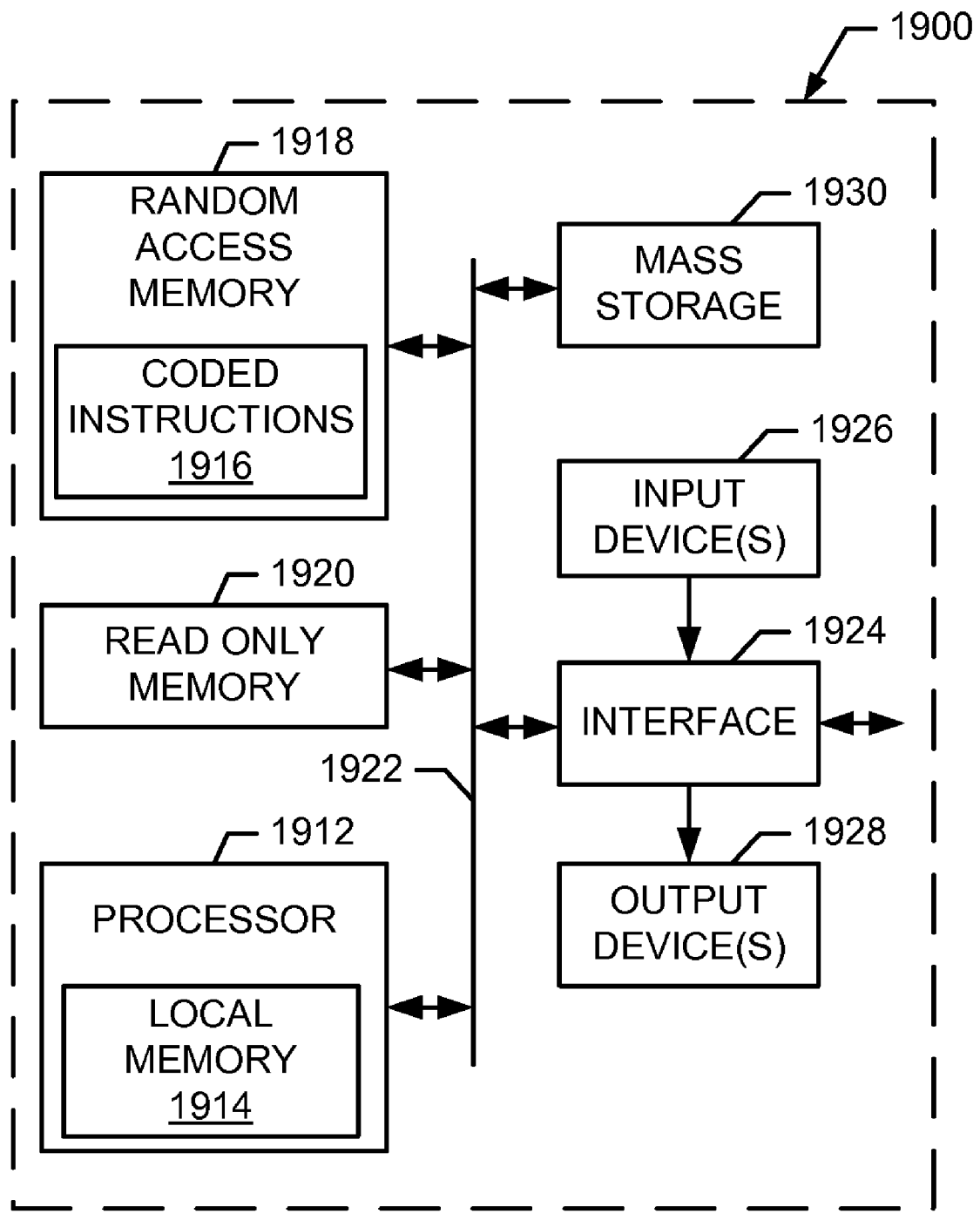
FIG. 19 is a block diagram of an example computer that may store and/or execute example machine readable instructions used to implement some or all of the processes of FIGS. 13-17 and/or 18 to implement the example media content monitoring systems of FIGS. 1, 2 and/or 3.

FIG. 19 is a block diagram of an example computer 1900 capable of implementing the apparatus and methods disclosed herein. The computer 1900 can be, for example, a server, a personal computer, a personal digital assistant (PDA), an Internet appliance, a DVD player, a CD player, a digital video recorder, a personal video recorder, a set top box, or any other type of computing device.

The system 1900 of the instant example includes a processor 1912 such as a general purpose programmable processor. The processor 1912 includes a local memory 1914, and executes coded instructions 1916 present in the local memory 1914 and/or in another memory device. The processor 1912 may execute, among other things, machine readable instructions to implement the processes represented in FIGS. 13 through 18. The processor 1912 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1912 is in communication with a main memory including a volatile memory 1918 and a non-volatile memory 1920 via a bus 1922. The volatile memory 1918 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1920 may be implemented by flash memory and/or any other desired type of memory device. Access to the main memory 1918, 1920 is typically controlled by a memory controller (not shown).

The computer 1900 also includes an interface circuit 1924. The interface circuit 1924 may be implemented by any type of interface standard, such as an Ethernet interface, a universal serial bus (USB), and/or a third generation input/output (3GIO) interface.

One or more input devices 1926 are connected to the interface circuit 1924. The input device(s) 1926 permit a user to enter data and commands into the processor 1912. The input device(s) can be implemented by, for example, a keyboard, a mouse, a touchscreen, a track-pad, a trackball, an isopoint and/or a voice recognition system.

One or more output devices 1928 are also connected to the interface circuit 1924. The output devices 1928 can be implemented, for example, by display devices (e.g., a liquid crystal display, a cathode ray tube display (CRT)), by a printer and/or by speakers. The interface circuit 1924, thus, typically includes a graphics driver card.

The interface circuit 1924 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1900 also includes one or more mass storage devices 1930 for storing software and data. Examples of such mass storage devices 1930 include floppy disk drives, hard drive disks, compact disk drives and digital versatile disk (DVD) drives. The mass storage device 1930 may implement the example database 226, the example database 330 and/or the example stored profile database 430. Alternatively, the volatile memory 1918 may implement the example database 226, the example database 330 and/or the example stored profile database 430.

As an alternative to implementing the methods and/or apparatus described herein in a system such as the device of FIG. 19, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A computer-implemented method to detect primary media content included in a secondary media content presentation, the method comprising:

determining a first image corresponding to the secondary media content presentation, the first image comprising a plurality of image subregions, each image subregion representative of an inter-frame variation associated with a corresponding subregion of the secondary media content presentation;

selecting a region of the first image comprising a plurality of connected image subregions of the first image together exhibiting a first type of inter-frame variation;

when a shape of the selected region of the first image corresponds to a first predefined shape, processing a region of the secondary media content presentation corresponding to the selected region of the first image to detect the primary media content;

determining a second image corresponding to the secondary media content presentation;

selecting a region of the second image comprising a plurality of connected image subregions of the second image together exhibiting a second type of inter-frame variation; and when the shape of the selected region of the first image corresponds to the first predefined shape and a shape of the selected region of the second image corresponds to a second predefined shape different from the first predefined shape, determining that the primary media content corresponds to a commercial.

2. A computer-implemented method as defined in claim 1 wherein possible types of inter-frame variation include substantially uniform variation, substantially non-uniform variation and substantially no variation, and wherein the first type of inter-frame variation corresponds to substantially non-uniform variation.

3. A computer-implemented method as defined in claim 1 wherein each subregion of the first image corresponds to a respective pixel of the first image.

4. A computer-implemented method as defined in claim 1 wherein determining the first image comprises encoding each subregion of the first image to represent the inter-frame variation associated with the corresponding subregion of the secondary media content presentation.

5. A computer-implemented method as defined in claim 1 further comprising comparing a first captured representation of the secondary media content presentation with a previous second captured representation of the secondary media content presentation to determine the inter-frame variation associated with each subregion of the first image.

6. A computer-implemented method as defined in claim 1 wherein the secondary media content presentation is derived from Moving Picture Experts Group (MPEG) data, and further comprising using at least one of motion vectors or static macroblocks included in the MPEG data to determine the inter-frame variation associated with each subregion of the first image.

7. A computer-implemented method as defined in claim 1 further comprising:
segmenting the first image into a plurality of regions, each region comprising a respective plurality of connected image subregions of the first image; and
charactering each region as exhibiting one of substantially uniform variation, substantially non-uniform variation or substantially no variation.

8. A computer-implemented method as defined in claim 7 further comprising performing at least one of line detection or edge detection to segment the first image into the plurality of regions.

9. A computer-implemented method as defined in claim 1 wherein the first predefined shape comprises a rectangle having a predefined aspect ratio.

10. A computer-implemented method as defined in claim 1 wherein the first predefined shape corresponds to a stored profile representative of a possible secondary media content presentation layout.

11. A computer-implemented method as defined in claim 1 further comprising:
generating a monitored signature from the processed region of the secondary media content presentation; and
identifying the primary media content as corresponding to particular reference content when the monitored signature substantially matches a reference signature representative of the particular reference content.

12. A computer-implemented method as defined in claim 1 further comprising detecting a watermark embedded in the processed region of the secondary media content presentation to identify the primary media content.

13. A computer-implemented method as defined in claim 1 wherein possible types of inter-frame variation include substantially uniform variation, substantially non-uniform variation or substantially no variation, and wherein the first and second types of inter-frame variation both correspond to substantially non-uniform variation.

14. A computer-implemented method as defined in claim 1 wherein the first predefined shape corresponds to a first stored profile representative of a first possible secondary media content presentation layout and the second predefined shape corresponds to a second stored profile representative of a second possible secondary media content presentation layout.

15. A tangible machine readable storage medium comprising machine readable instructions which, when executed, cause a machine to at least:
determine a first synthetic image corresponding to a first captured image representative of a secondary media content presentation including primary media content and other media content, the first synthetic image comprising a plurality of synthetic image subregions, each synthetic image subregion encoded to represent motion associated with a corresponding subregion of the first captured image;
select a region of the first synthetic image comprising a plurality of connected synthetic image subregions of the first synthetic image together exhibiting substantially non-uniform motion;
obtain a shape of the selected region of the first synthetic image and a shape of a selected region of a second synthetic image, the second synthetic image corresponding to a second captured image preceding the first captured image;
when the shape of the selected region of the first synthetic image corresponds to a first predefined shape, extract a region of the first captured image corresponding to the selected region of the first synthetic image to identify the primary media content; and
when the shape of the selected region of the first synthetic image corresponds to the first predefined shape and the shape of the selected region of the second synthetic image corresponds to a second predefined shape different from the first predefined shape, determine that the primary media content corresponds to a commercial.

16. A machine readable storage medium as defined in claim 15 wherein the machine readable instructions, when executed, further cause the machine to detect a watermark embedded in the extracted region of the first captured image to identify the primary media content.

17. A machine readable storage medium as defined in claim 15 wherein the machine readable instructions, when executed, further cause the machine to:
segment the first synthetic image into a plurality of regions, each region comprising a respective plurality of connected synthetic image subregions of the first synthetic image; and
characterize each region as exhibiting one of substantially uniform motion, substantially non-uniform motion or substantially no motion.

18. A machine readable storage medium as defined in claim 15 wherein the machine readable instructions, when executed, further cause the machine to:
  generate a monitored signature from the extracted region of the first captured image; and
  identify the primary media content as corresponding to particular reference content when the monitored signature substantially matches a reference signature representative of the particular reference content.

19. A media content monitoring unit comprising:
  an image pre-processor to:
    determine a first synthetic image corresponding to a first captured image representative of a secondary media content presentation monitored by the media content monitoring unit, the first synthetic image comprising a plurality of synthetic image subregions, each synthetic image subregion encoded to represent motion associated with a corresponding subregion of the first captured image;
    select a region of the first synthetic image comprising a plurality of connected synthetic image subregions of the first synthetic image together exhibiting substantially non-uniform motion, the selected region excluding a portion of the first synthetic image; and
    when a shape of the selected region of the first synthetic image corresponds to a predefined shape, extract a region of the first captured image corresponding to the selected region of the first synthetic image to identify primary media content included in the secondary media content presentation;
  a signature generator to generate a signature from the region of the first captured image extracted by the image pre-processor; and
  a hint processor to process hint information associated with the region of the first captured image extracted by the image pre-processor to determine whether the primary media content corresponds to a commercial, wherein the hint processor is to:
    obtain a plurality of signatures generated by the signature generator and corresponding to a respective plurality of extracted regions from successive captured images, and
    determine whether at least one of the obtained plurality of signatures is representative of a blank frame separating commercial content from non-commercial content.

20. A media content monitoring unit comprising:
  an image pre-processor to:
    determine a first synthetic image corresponding to a first captured image representative of a secondary media content presentation monitored by the media content monitoring unit, the first synthetic image comprising a plurality of synthetic image subregions, each synthetic image subregion encoded to represent motion associated with a corresponding subregion of the first captured image;
    select a region of the first synthetic image comprising a plurality of connected synthetic image subregions of the first synthetic image together exhibiting substantially non-uniform motion, the selected region excluding a portion of the first synthetic image; and
    when a shape of the selected region of the first synthetic image corresponds to a first predefined shape, extract a region of the first captured image corresponding to the selected region of the first synthetic image to identify primary media content included in the secondary media content presentation;
  a signature generator to generate a signature from the region of the first captured image extracted by the image pre-processor; and
  a hint processor to process hint information associated with the region of the first captured image extracted by the image pre-processor to determine whether the primary media content corresponds to a commercial, wherein the hint processor is to:
    obtain the shape of the selected region of the first synthetic image and a shape of a selected region of a second synthetic image, the second synthetic image corresponding to a second captured image preceding the first captured image; and
    when the shape of the selected region of the first synthetic image corresponds to the first predefined shape and the shape of the selected region of the second synthetic image corresponds to a second predefined shape different from the first predefined shape, determine that the primary media content corresponds to a commercial.

21. A media content monitoring unit as defined in claim 20 wherein the first predefined shape corresponds to a first stored profile representative of a first possible secondary media content presentation layout associated with a commercial presentation and the second predefined shape corresponds to a second stored profile representative of a second possible secondary media content presentation layout associated with a non-commercial presentation.

* * * * *